US006690378B1

(12) United States Patent
Kohashi et al.

(10) Patent No.: US 6,690,378 B1
(45) Date of Patent: Feb. 10, 2004

(54) IMAGE PROCESSOR AND IMAGE PROCESSING METHOD

(75) Inventors: Yasuo Kohashi, Fukuoka (JP); Shunichi Kuromaru, Fukuoka (JP); Masayoshi Tojima, Fukuoka (JP); Hitoshi Fujimoto, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/446,022

(22) PCT Filed: Jun. 11, 1998

(86) PCT No.: PCT/JP98/02581

§ 371 (c)(1),
(2), (4) Date: Mar. 14, 2000

(87) PCT Pub. No.: WO98/58495

PCT Pub. Date: Dec. 23, 1998

(30) Foreign Application Priority Data

Jun. 16, 1997 (JP) ............................................. 9-158843

(51) Int. Cl.[7] ................................................. G09G 5/39
(52) U.S. Cl. ........................ 345/532; 345/531; 382/232
(58) Field of Search ................................. 345/531, 530, 345/532, 534, 555, 556; 382/232, 233, 235

(56) References Cited

U.S. PATENT DOCUMENTS

| 4,956,706 | A | * | 9/1990 | Ohba ........................... 348/578 |
| 5,499,327 | A | * | 3/1996 | Satoh ........................... 395/135 |
| 5,544,329 | A | | 8/1996 | Engel et al. |
| 5,592,641 | A | | 1/1997 | Fandrich et al. |
| 5,949,555 | A | * | 9/1999 | Sakai et al. .................. 358/462 |
| 5,969,828 | A | * | 10/1999 | Kawasaki et al. ........... 358/426 |

FOREIGN PATENT DOCUMENTS

| CA | 1267970 | 4/1990 |
| EP | 0 510 640 A2 | 10/1992 |
| JP | 4-77119 | 3/1992 |
| JP | 5-91494 | 4/1993 |
| JP | 6-223170 | 8/1994 |
| JP | 8-9368 | 1/1996 |
| JP | 8-16538 | 1/1996 |

OTHER PUBLICATIONS

S. Okada, Y. Matsuda, T. Watanabe, K. Kondo: "A Single Chip Motion JPEG Codec LSI" IEEE Transactions on Consumer Electronics, vol. 43, No. 3, (Aug. 1, 1997), pp. 418–422.

* cited by examiner

Primary Examiner—Matthew C. Bella
Assistant Examiner—Mackly Monestime
(74) Attorney, Agent, or Firm—Wenderoth, Lind & Ponack, L.L.P.

(57) ABSTRACT

An object of the present invention is to provide an image processing apparatus in which a delay from start of image data input to start of coding is small, the capacity of a temporary storage device used for temporarily storing the image data to be coded is small, and the possibility of discarding the image data is low even when coding is delayed and, therefore, the image quality is hardly degraded. Since this apparatus is provided with a flag generator for generating control information according to the processing status, input/output of the image data in/from the temporary storage device is performed for each unit amount, and storage and coding of the image data are executed according to the control information.

24 Claims, 12 Drawing Sheets

IMAGE PROCESSOR AND IMAGE PROCESSING METHOD

TECHNICAL FIELD

The present invention relates to an image processing apparatus and an image processing method and, more particularly, to image processing in which input image data is temporarily stored in a storage device, and the stored image data is subjected to coding.

BACKGROUND ART

Although image data including a time-varying image is originally analog data, when this data is digitized, various kinds of complicated signal processing and data compression can be performed on the data and, therefore, the technology of image digitization forms an important field. In an image processing apparatus according to a prior art, input analog image data is subjected to analog-to-digital conversion and compressive coding for recording or transmission, and generally the digitized image data is temporarily stored in a high-speed storage unit such as a memory before being subjected to compressive coding. An example of an image processing apparatus with such temporary storage is disclosed in Japanese Patent Application No. Hei. 7-273461, in which digital image data is temporarily stored in a memory called an image frame memory.

FIG. 10 is a block diagram showing the structure of an image processing apparatus according to the prior art. As shown in the figure, the prior art image processing apparatus is provided with an A/D converter 1001, an image input controller 1002, a memory controller 1003, an encoder 1004, an input image memory 1005, and a rate buffer 1006, and this apparatus receives an analog video signal S1051 and outputs coded data S1057. In FIG. 10, signals shown by solid lines indicate the flow of data to be processed, and signals shown by broken lines indicate the flow of signals for control.

The A/D converter 1001 subjects the input analog video signal S1051 to analog/digital conversion to generate digital image data S1052. The image input controller 1002 generates an image input enabling signal S1061 indicating whether the input digital image data S1052 is "effective" or "ineffective". The memory controller 1003 controls storage and readout of the digital image data into/from the memory. The encoder 1004 subjects the digital image data S1055 to a predetermined compressive coding process to generate coded data S1056.

The input image memory 1005 temporarily stores the digital image data S1054 for the work of the compressive coding process. In the prior art image processing apparatus, the input image memory is divided into plural regions each region storing a predetermined quantity of digital image data. Here, the input image memory 1005 has two regions, namely, a first region 1005a and a second region 1005b, each region being able to store one frame (one screen) of digital image data.

The rate buffer 1006 temporarily stores the coded data S1056 generated by the coder 1004 and outputs the data so that the output S1057 from the image processing apparatus is output at a constant rate. Hereinafter, the operation of the prior art image processing apparatus so constructed will be described.

When an analog video signal S1051 is input to the image processing apparatus, the analog video signal S1051 is input to the A/D converter 1001, wherein it is subjected to analog/digital conversion. The A/D converter 1001 generates digital image data S1052 and outputs this data to the image input controller 1002. The input analog video signal S1051 includes a signal of an effective region corresponding to a portion of image to be displayed, and a signal of an ineffective region other than the effective region. The image input controller 1002 generates an image input enabling signal S1061 indicating whether the input digital image data S1052 is "effective" or "ineffective", and outputs both of the digital image data S1053 and the image input enabling signal S1061 to the memory controller 1003.

The memory controller 1003 stores the digital image data S1053 in the input image memory 1005, according to the image input enabling signal S1061 supplied from the image input controller 1002 and an image input request signal S1063 supplied from the encoder 1004 which is described later. When the encoder 1004 goes into the coding executable state and outputs an image input request signal S1063 indicating a request for digital image data to be subjected to coding, to the memory controller 1003, the memory controller 1003 stores the digital image data S1053 in the first region 1005a of the input image memory according to the image input enabling signal S1061 indicating that the digital image data S1053 is effective.

When a predetermined amount of the digital image data S1053 is stored in the first region 1005a, the memory controller 1003 generates a coding start signal S1062 and outputs it to the encoder 1004 so that the encoder 1004 starts coding. Here, the memory controller 1003 generates the signal when one frame of digital image data has been stored.

The encoder 1004 does not perform coding until it receives the coding start signal S1062 directing coding, from the memory controller 1003. When the encoder 1004 has received this signal, it receives the digital image data S1055 stored in the first region 1005a through the memory controller 1003, and performs coding of this data. This coding is carried out according to a predetermined scheme. For example, one frame of digital image data is divided into plural blocks each having a predetermined size, and coding is carried out block by block. When this coding is carried out, the size of each block is generally 8×8 pixels or 16×16 pixels. Further, "a pixel" is discrete unit data as a component of digital image data, and it has a pixel value showing the brightness or color of the image.

The encoder 1004 outputs coded data S1056 generated by the coding, to the rate buffer 1006. The coded data S1056, which has temporarily been stored in the rate buffer 1006, is output to the outside of the image processing apparatus as an output S1057 from the apparatus, for transmission or the like. On the other hand, as the coding is executed, the encoder 1004 generates an image input request signal S1063 indicating that one frame of digital image data to be coded next is to be input, and outputs this signal S1063 to the memory controller 1003.

In the memory controller 1003, the digital image data S1053 is stored in the input image memory 1005 according to the image input request signal S1063 and the input enabling signal S1061 indicating that the digital image data S1053 is effective. As described above, one frame of digital image data is stored in the memory 1005. However, at this time, the memory controller 1003 stores the data in the second region 1005b different from the first region 1005a.

When one frame of digital image data S1053 (a unit of digital image data) has been stored in the second region 1005b, the memory controller 1003 generates a coding start signal S1062 indicating that coding should be started, and outputs this signal to the encoder 1004. If the encoder 1004 has ended coding of the previous one frame of digital image data (data which were stored in the region 1005a) when it receives the coding start signal S1062 which directs the encoder to start coding, from the memory controller 1003, the encoder 1004 receives the digital image data S1055 stored in the second region 1005b through the memory controller 1003, performs coding of this data, and outputs coded data to the rate buffer 1006.

As described above, in the prior art image processing apparatus, digital image data is stored alternately in the first region 1005a and the second region 1005b possessed by the input image memory 1005, and the stored data is read alternately from these regions to be coded by the encoder 1004.

FIG. 11 is a timing chart showing the processing status in the normal state wherein the above-mentioned processing is carried out normally. In FIG. 11, "image input request signal S1063" indicates the state of the signal S1063 output from the encoder 1004 to the memory controller 1003, and its Hi state shows that the encoder 1004 requests digital image data. Further, "image input enabling signal S1061" indicates the state of the signal S1061 which is generated by the image input controller 1002 to be output to the memory controller 1003, and its Hi state shows that the digital image data is effective and to be stored in the memory.

Furthermore, "storage of image data" in FIG. 11 indicates regions of the input image memory 1005 where the digital image data S1054 is stored. As described above, under control of the memory controller 1003, the digital image data is stored alternately in the first region 1005a (in the figure, memory (1)) and the second region 1005b (in the figure, memory (2) ), which regions are possessed by the input image memory 1005.

Turning to FIG. 11, "coding start signal S1062" indicates the state of the signal S1062 output from the memory controller 1003 to the encoder 1004, and its Hi state shows that coding should be started. Further, "coding process" indicates a coding process performed by the encoder 1004, and it indicates that the digital image data stored in the first region 1005a (in the figure, memory (1)) or the second region 1005b (in the figure, memory (2)) is being subjected to coding, which regions are possessed by the input image memory 1005.

As shown in the figure, in accordance with the Hi state of the image input request signal S1063, from timing t110, the digital image data whose image input enabling signal S1061 is in the Hi state is stored in the first region, as shown by "image data storage". Then, in accordance with the Hi state of the coding start signal S1062 shown in the figure, from timing t111, the digital image data is read from the first region to be coded. Further, as the coding is carried out, storage of data in the second region is carried out as shown by "image data storage". Likewise, from timing t112, storage of data in the first region and readout of data from the second region are carried out. As shown by "image data storage" and "coding process" in the figure, at the timing when storage of data in one of the regions is carried out, readout of data from the other region is carried out.

On the other hand, FIG. 12 is a timing chart showing the processing state where an error has occurred for some reason, and this error disables the normal processing shown in FIG. 11. Also in this case, the processing is carried out in like manner as shown in FIG. 11 until timing t120.

In FIG. 12, "coding process" indicates that the coding of the digital image data stored in the second region 1005b (FIG. 1), which coding has been performed from timing t120, takes time and, therefore, the end of this coding is delayed to timing t121. Accordingly, with respect to the second region 1005b of the input image memory 1005, readout of the digital image data from this region is carried out until reaching timing t121, and thereby storage of digital image data into the second region shown by "image data storage" is not performed although this storage ought to be carried out if the processing has been normally carried out. Therefore, as shown by the broken-line square of "image data storage" in FIG. 12, the digital image data which has not been stored is discarded, i.e., it is not subjected to the coding process.

After the coding process has ended at timing t122, the normal processing is carried out again. As described above, in the prior art image processing apparatus, storage and readout are alternately performed in/from the regions possessed by the input image memory 1005. In this way, the prior art image processing apparatus is able to perform storage and coding of digital image data at their respective timings, and copes with a delay or the like in the coding process by discarding the digital image data. Also in the apparatus disclosed in the above-mentioned Japanese Patent Application No. 7-273461, memory management similar to that mentioned above is performed.

However, the conventional image processing apparatus has the following problems.

First of all, when the image processing apparatus is used in a visual telephone system or as a monitor between an input apparatus such as a video camera and an output apparatus such as a display, it is required to have the property of operating real-time. When the apparatus is applied to such use, the apparatus captures an image from a video camera or the like as a target to be processed and, after processing, coded data is output from the apparatus for transmission or the like. At the reproduction end, the coded data is subjected to decoding and then output as an image. So, if a delay from inputting analog image data to displaying output image data is considerable, a time difference occurs in motions between the real image taken by the camera and the displayed image, resulting in unnatural image display.

As described above, in the prior art image processing apparatus, in order to control data input/output to/from the input image memory, the encoder 1004 starts coding in response to the coding start signal S1062 when the digital image data to be subjected to coding has been stored by a predetermined amount (in the above example, one frame) (FIG. 11). Therefore, in the prior art image processing apparatus, because of a delay between the signal input and the start of coding, it is hard to satisfactorily display the image when the apparatus is applied to such use. This is the first problem.

Further, in the prior art image processing apparatus, as described above, unconditional discarding of digital image data is performed for error processing. Since this unconditional discarding causes absence of data, frequent delays in the coding process result in degradation of image quality. This is the second problem.

Moreover, since the input image memory 1005 is divided into the region where storage is performed and the region where readout is performed, when the amount of digital image data to be processed is large, the memory capacity must be increased according to the data amount. However, to require a bulk memory results in an increase in the cost and, therefore, it is difficult to fabricate an inexpensive apparatus for propagation. This is the third problem.

SUMMARY OF THE INVENTION

The present invention is made in view of the above-described circumstances and has an object to provide an image processing apparatus which reduces a delay time from start of signal input to start of coding and, therefore, is suitable for the real-time use.

Further, the present invention has another object to provide an image processing apparatus which reduces the amount of data to be discarded and thereby improves the image quality, even when a delay or the like occurs during coding.

Further, the present invention has still another object to provide an image processing apparatus which reduces the capacity of memory required for temporary storage of digital data and thereby reduces the cost.

Further, the present invention has yet another object to provide an image processing method which reduces a delay time before start of coding, an image processing method which reduces the possibility of discarding data even if coding is delayed, and an image processing method which reduces the capacity of memory required for temporary storage of data.

To attain the above-mentioned objects, an image processing apparatus of a first aspect of the present invention, which is an apparatus for storing input image data in a temporary storage device and subjecting the stored image data to a coding process, comprises: an image input control device for controlling storage of the input image data in the temporary storage device; a storage control device for executing storage of the image data in the temporary storage device under control of the image input control device and, when a predetermined unit storage amount of data has been stored, generating storage information indicating this; a coding device for reading the image data stored in the temporary storage device to subject the read data to a predetermined coding process and, when a predetermined unit processing amount of data has been subjected to the coding process, generating process information indicating this; and a control information generating device for generating first control information used by the image input control device to control the storage, and second control information used by the coding device to control the coding process, in accordance with the storage information generated by the storage control device and the process information generated by the coding device. Thereby, the control information generating device generates control information for controlling the storage and the coding process, according to the image processing status obtained from the storage information and the process information.

According to an image processing apparatus of another aspect of this invention, the control information generating device generates, as the first control information, storage stop information indicating that the storage of the input image data should be stopped, and generates, as the second control information, coding stop information indicating that the coding process should be stopped. According to the status of image processing, the storage is stopped to protect the data which have already been stored, and the coding is stopped to stand by until data to be coded are stored.

According to an image processing apparatus another aspect of this invention, the control information generating device generates, as the first control information, storage stop information indicating that the storage of the input image data should be stopped, and generates, as the second control information, continuous process information indicating how many times the coding device can continuously perform the coding process on the unit processing amount of image data. According to the status of image processing, the storage is stopped to protect the data which have already been stored, and continuous coding according to the status of storage is performed.

According to an image processing apparatus of another aspect of this invention, the control information generating device comprises: a storage information counting device for counting the storage information and holding the result as a storage information count value; a process information counting device for counting the process information and holding the result of the count as a process information count value; an addition control device for outputting an addition enabling signal when the count of the storage information is performed by a predetermined number of times, and outputting an addition disabling signal when the count of the process information is performed by a predetermined number of times; a storage information count value change device for adding a predetermined value to the storage information count value according to the addition enabling signal or the addition disabling signal, thereby generating a storage information count value after processing; a codable unit number generating device for subtracting the process information count value from the storage information count value after processing, thereby generating a codable unit number; a first control information generating device for comparing the codable unit number with a first predetermined value and, when these values match, generating the first control information; and a second control information generating device for comparing the codable unit number with a second predetermined value and, when these values match, generating the second control information. Thereby, the codable unit number indicating the storage status of data to be coded is obtained from the storage information and the process information, and the control information is generated according to the codable unit number to control the storage and the coding.

According to an image processing apparatus of another aspect of this invention, the control information generating device comprises: a storage information counting device for counting the storage information and holding the result as a storage information count value; a process information counting device for counting the process information and holding the result as a process information count value; an addition control device for outputting an addition enabling signal when the count of the storage information has been performed by a predetermined number of times, and outputting an addition disabling signal when the count of the process information has been performed by a predetermined number of times; a storage information count value change device for adding a predetermined value to the storage information count value according to the addition enabling signal or the addition disabling signal, thereby generating a storage information count value after processing; a codable unit number generating device for subtracting the process information count value from the storage information count value after processing, thereby generating a codable unit number; and a first control information generating device for comparing the codable unit number with a first predetermined value and, when these values match, generating the first control information; wherein the codable unit number is used as the second control information. Thereby, the codable unit number indicating the storage status of data to be coded is obtained from the storage information and the process information, and the control information is generated according to the codable unit number to control the storage and the continuous coding.

An image processing method according to another aspect of this invention, which is a method for storing input image data in a temporary storage device and performing coding of the stored image data, comprises: controlling storage of the input image data in the temporary storage device; executing storage of the image data in the temporary storage device under control of the image input control step and, when a predetermined unit storage amount of data has been stored, generating storage information indicating this; reading the image data stored in the temporary storage device to subject the read data to a predetermined coding process and, when a predetermined unit processing amount of data has been subjected to the coding process, generating process information indicating this; and generating first control information used in the controlling to control the storage, and second control information used in the coding to control the coding process, according to the storage information generated in the storage control and the process information generated in the coding. Thereby, in the control information generating, the control information for controlling the storage and the coding process is generated according to the image processing status obtained from the storage information and the process information.

According to an image processing method of another aspect of this invention, in the control information generating, storage stop information indicating that the storage of the input image data should be stopped is generated as the first control information, and coding stop information indicating that the coding process should be stopped is generated as the second control information. According to the status of image processing, the storage is stopped to protect the data which have already been stored, and the coding is stopped to stand by until data to be coded are stored.

According to an image processing method of another aspect of this invention, in the control information generating, storage stop information indicating that the storage of the input image data should be stopped is generated as the first control information, and continuous process information indicating how many times the coding process on the unit processing amount of image data can be continuously performed in the coding is generated as the second control information. According to the status of image processing, the storage is stopped to protect the data which have already been stored, and continuous coding according to the status of storage is performed.

According to an image processing method of yet another aspect of this invention, the control information generating comprises: counting the storage information and holding the result as a storage information count value; counting the process information and holding the result as a process information count value; outputting an addition enabling signal when the count of the storage information is performed by a predetermined number of times, and outputting an addition disabling signal when the count of the process information is performed by a predetermined number of times; adding a predetermined value to the storage information count value according to the addition enabling signal or the addition disabling signal, thereby generating a storage information count value after processing; subtracting the process information count value from the storage information count value after processing, thereby generating a codable unit number; comparing the codable unit number with a first predetermined value and, when these values match, generating the first control information; and comparing the codable unit number with a second predetermined value and, when these values match, generating the second control information. Thereby, the codable unit number indicating the storage status of data to be coded is obtained from the storage information and the process information, and the control information is generated according to the codable unit number to control the storage and the coding.

According to an image processing method of yet another aspect of this invention, the control information generating comprises: counting the storage information and holding the result as a storage information count value; counting the process information and holding the result as a process information count value; outputting an addition enabling signal when the count of the storage information is performed by a predetermined number of times, and outputting an addition disabling signal when the count of the process information is performed by a predetermined number of times; adding a predetermined value to the storage information count value according to the addition enabling signal or the addition disabling signal, thereby generating a storage information count value after processing; subtracting the process information count value from the storage information count value after processing, thereby generating a codable unit number; comparing the codable unit number with a first predetermined value and, when these values match, generating the first control information; and using the codable unit number as the second control information. Thereby, the codable unit number indicating the storage status of data to be coded is obtained from the storage information and the process information, and the control information is generated according to the codable unit number to control the storage and the continuous coding.

DETAILED DESCRIPTION OF THE PREFERRED EMBODIMENTS

Embodiment 1

An image processing apparatus according to a first embodiment of the present invention is provided with a flag generator, and controls image processing and manages a memory by using control flags.

Figure 1:
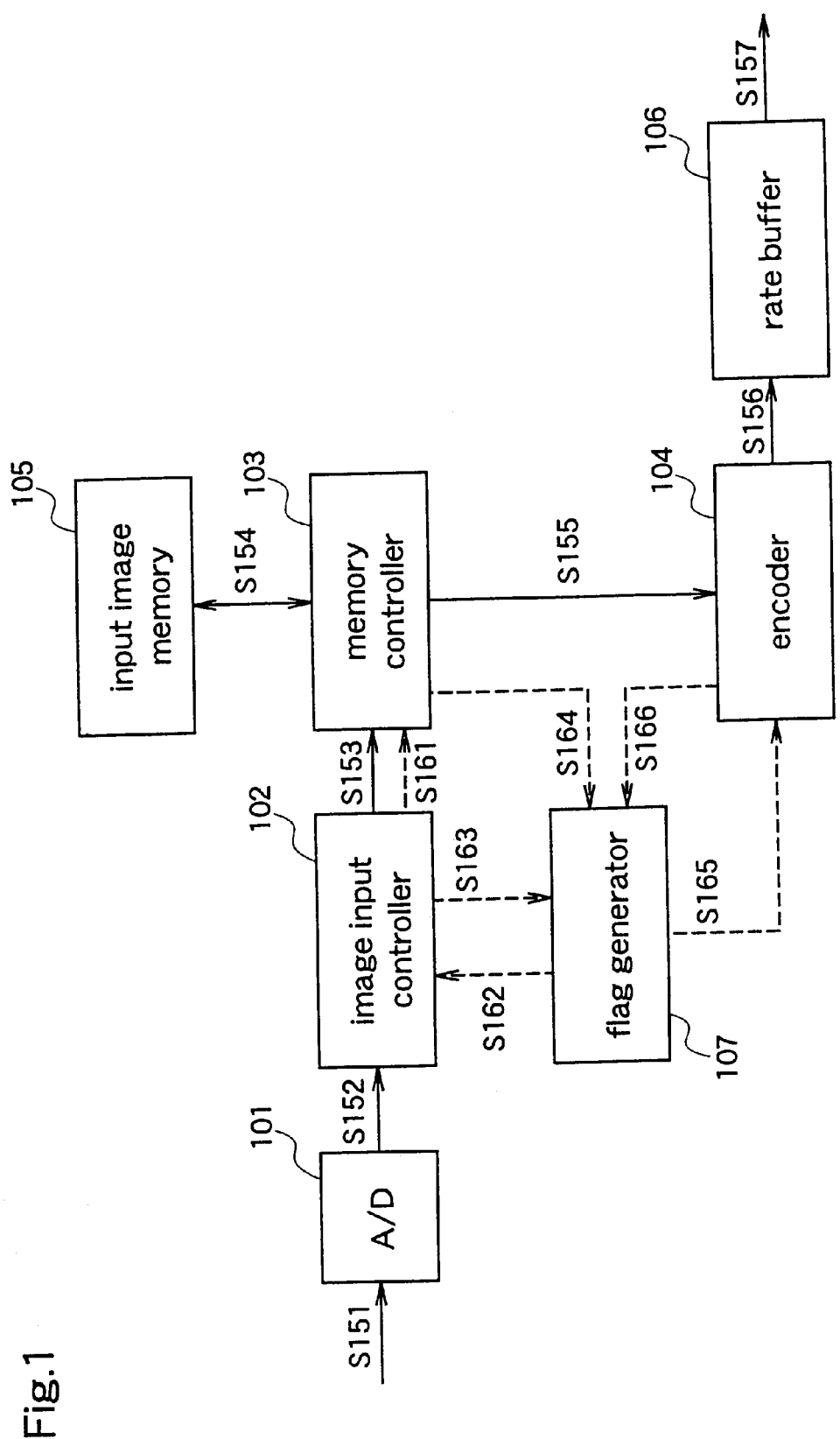
FIG. 1 is a block diagram illustrating the structure of an image processing apparatus according to a first embodiment of the present invention.

FIG. 1 is a block diagram illustrating the structure of the image processing apparatus according to the first embodiment, which receives analog image data and subjects the data to digital conversion and compressive coding. As shown in the figure, the image processing apparatus according to the first embodiment is provided with an A/D converter 101, an image input controller 102, a memory controller 103, an encoder 104, an input image memory 105, a rate buffer 106, and a flag generator 107. This apparatus receives an analog video signal S151, and outputs coded data S157. In FIG. 1, signals shown by solid lines indicate the flow of data to be processed, and signals shown by broken lines indicate the flow of signals for control.

The A/D converter 101 subjects the input analog video signal S151 to analog/digital conversion to generate digital image data S152. The image input controller 102 generates an image input enabling signal S161 indicating whether the input digital image data S152 is "effective" or "ineffective". In this first embodiment, as in the case of the prior art image processing apparatus, the image input controller 102 generates an image input enabling signal S161 according to the distinction between the effective region and the ineffective region of the digital image data and, further, it refers to an error flag S162 supplied from the flag generator 107 which will be described later. When the error flag S162 is ineffective (Lo state), the image input controller 102 generates an image input enabling signal S161 indicating "effective". When the error flag S162 is effective (Hi state), it generates an image input enabling signal S161 indicating "ineffective".

The memory controller 103 controls storage and readout of digital image data in/from the memory. The memory controller 103 according to this first embodiment controls storage and readout of digital image data in/from the input image memory 105 for a predetermined amount as a unit and, when storage of data for each unit has been completed, it generates a writing end signal S164 indicating the completion and then outputs this signal to the flag generator 107. Therefore, the memory controller 103 functions as a storage control device which performs storage of digital image data into a temporary storage device (input image memory 105) under control of an image input control device (image input controller 102) and generates storage information (writing end signal S164) when a predetermined amount (unit amount) of data has been stored.

The encoder 104 subjects the digital image data S155 to a predetermined compressive coding process to generate coded data S156. The encoder 104 according to this first embodiment refers to an empty flag S165 which is supplied from the flag generator 107 described later. When the empty flag S165 is in the Lo state, the encoder 104 performs coding, and when the empty flag S165 is in the Hi state, the encoder 104 does not perform coding. Further, the encoder 104 performs coding for a predetermined amount of data as a unit. When coding for each unit has been completed, it generates a coding end signal S166 indicating the completion and outputs this signal to the flag generator 107. Accordingly, the encoder 104 functions as a coding device which reads image data stored in a temporary storage device (input image memory 105), subjects the data to a prescribed coding process, and generates process information (coding end signal S166) when a predetermined amount (unit amount) of data has been coded.

The input image memory 105 temporarily stores the digital image data S154 for the work of compressive coding.

In this first embodiment, in contrast with the prior art image processing apparatus, the memory 105 is not divided into specific regions (two regions in the prior art example) to be managed, and a capacity enough to store a predetermined amount (one frame) of digital image data suffices for the input image memory 105. The rate buffer 106 temporarily stores the coded data S156 so that the coded data S157, which is output from the image processing apparatus, is output at a constant rate.

The flag generator 107 counts the writing end signal for each unit amount supplied from the memory controller 103 and the coding end signal for each unit amount supplied from the encoder 104 and, according to the result of the count, it generates flags (empty flag and error flag) used for controlling input/output of the data to/from the memory. Therefore, the flag generator 107 functions as a control information generating device which generates first control information (error flag) used by an image input control device (image input controller 102) to control storage, and second control information (empty flag) used by a coding device (encoder 104) to control coding, according to the storage information (writing end signal S164) generated by the storage control device (memory controller 103) and the process information (coding end signal S166) generated by the coding device (encoder 104).

Figure 2:
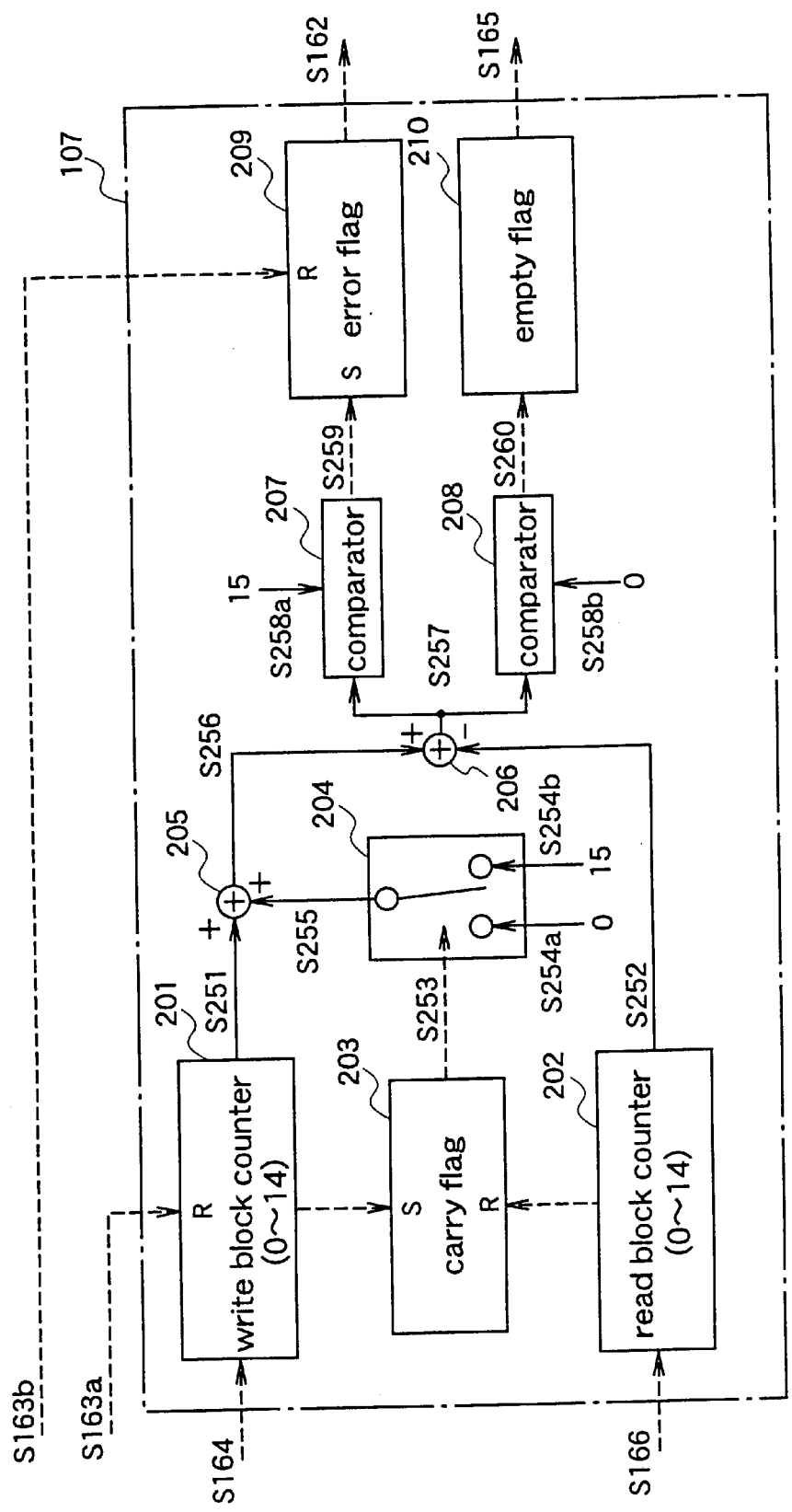
FIG. 2 is a block diagram illustrating the internal structure of a flag generator included in the image processing apparatus according to the first embodiment.

FIG. 2 is a block diagram illustrating the internal structure of the flag generator 107 (FIG. 1). As shown in FIG. 2, the flag generator 107 is provided with a write block counter 201, a read block counter 202, a carry flag holder 203, a selector 204, an adder 205, a subtracter 206, first and second comparators 207 and 208, an error flag holder 209, and an empty flag holder 210.

The write block counter 201 counts the writing end signal S164 supplied from the memory controller 103 (FIG. 1) for each slice (described later) as a unit, and outputs the count value to the adder 205 while holding it. This count is carried out according to a tetradecimal number system. When the count value has reached 14 and the next writing end signal S164 has been input, the count value becomes 0 and the carry flag holder 203 (described later) enters in the set state. Further, when a counter reset signal S163a instructing initialization is supplied from the image input controller 102 (FIG. 1), the count value becomes 0. Accordingly, the write block counter 201 functions as a storage information count device which counts the storage information (writing end signal S164) and holds the result of the count as a storage information count value.

The read block counter 202 counts the coding end signal S166 supplied from the encoder 104 (FIG. 1) for each slice (described later) as a unit, and outputs the count value to the subtracter 206 while holding it. This count is carried out according to a tetradecimal number system. When the count value has reached 14 and the next coding end signal S166 has been input, the count value becomes 0 and the carry flag holder 203 described later enters in the reset state. Accordingly, the read block counter 202 functions as a process information count device which counts the process information (coding end signal S166) and holds the result of the count as a process information count value.

The carry flag holder 203 is set when the counting operation of the write block counter 201 has reached 15, namely, when the count value of the write block counter has reached 14 and becomes 0 by the input of the next writing end signal, and the carry flag holder 203 is reset when the read block counter 202 counts 15, namely, when the count value of the read block counter has reached 14 and becomes 0 by the input of the next coding end signal. The carry flag holder 203 outputs a signal S253 to the selector 204, which signal S253 is in the Hi state when the holder 203 is in the set state and in the Lo state when the holder 203 is in the reset state.

When the selector 204 is supplied with the value 0 (signal S254a) and the value 15 (signal S254b), it selects one of these values according to the signal S253 supplied from the carry flag holder 203, and outputs the selected value to the adder 205. The selector 204 selects 0 when the signal S253 is in the Lo state while it selects 15 when the signal S253 is in the Hi state.

The adder 205 adds the count value (signal S251) of the write block counter 201 and the value (signal S255) output from the selector 204, and outputs the result (signal S256) to the 202 from the sum (signal S256) output from the adder 205. The subtracter 206 outputs a signal S257 indicating the result obtained by the subtraction to the first and second comparators 206 and 207. Accordingly, the carry flag holder 203, the selector 204, and the adder 205 function as an addition control device which outputs an addition enabling signal when the count of the storage information (writing end signal. S164) is carried out by a predetermined number of times, and outputs an addition disabling signal when the count of the process information (coding end signal S165) is carried out by a predetermined number of times, and as a storage information count value change device which adds a predetermined value (signal S255) to the storage information count value (count value of the write block counter 201) according to the addition enabling signal or the addition disabling signal to generate a storage information count value after processing (signal S256). Further, the subtracter 206 functions as a codable unit number generating device which subtracts the process information count value (signal S252) from the storage information count value after processing (signal S256) to generate a codable unit number (signal S257).

The first and second comparators 207 and 208 receive a signal S258a indicating 15 and a signal S258b indicating 0, respectively. The comparator 207 compares the signal S258a with the signal S257 while the comparator 208 compares the signal S258b with the signal S257 to decide whether these signals match each other or not. According to the result of the comparison, the comparator 207 generates a signal S259 indicating whether the signal S258a matches the signal S257 or not, and outputs it to the error flag holder 209. According to the result of the comparison, the comparator 208 generates a signal S260 indicating whether the signal S258b matches the signal S257 or not, and outputs it to the empty flag holder 210.

The error flag holder 209 is set when the signal S259 supplied from the comparator 207 indicates "match", namely, when the signal S257 is 15, and it is reset when an error reset signal SI 63b output from the image input controller 102 (FIG. 1) is input thereto. The error flag holder 209 outputs an error flag S162 in the Hi state when it is in the set state while it outputs an error flag S162 in the Lo state when it is in the reset state, to the image input controller 102 (FIG. 1).

The empty flag holder 210 generates an empty flag S165 in the Hi state when the signal S260 supplied from the comparator 208 indicates "match", that is, when the signal S257 is 0. The empty flag S165 is output to the encoder 104 as shown in FIG. 1.

Accordingly, the first comparator 207 and the error flag holder 209 function as a first control information generating device which compares the codable unit number (signal S257) with a first prescribed value (signal S258a), and generates the first control information (error flag S162 in the Hi state) when these signals match. Further, the second comparator 208 and the empty flag holder 210 function as a second control information generating device which compares the codable unit number (signal S257) with a second prescribed value (signal S258b), and generates the second control information (empty flag S165 in the Hi state) when these signals match. Further, the error flag S162 in the Hi state is used as storage stop information indicating that storage of the input image data should be stopped, and the empty flag S165 in the Hi state is used as coding stop information indicating that coding should be stopped.

Figure 3:
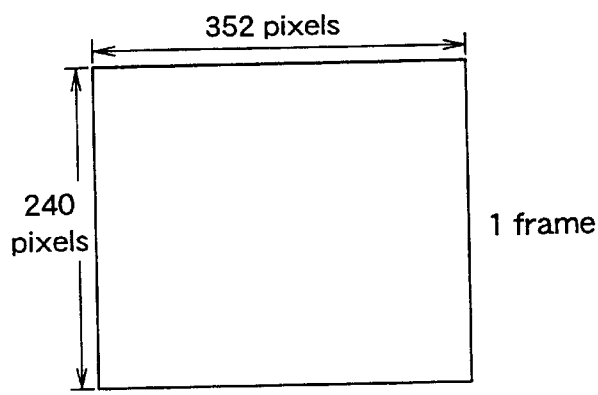
FIGS. 3(a)–3(c) are diagrams for explaining the structure of digital image data to be processed by the image processing apparatus according to the first embodiment.
Figure 3:
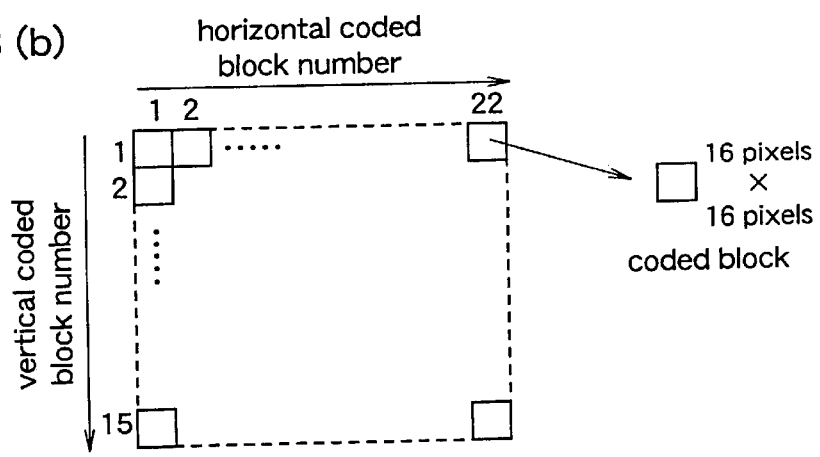
Figure 3:
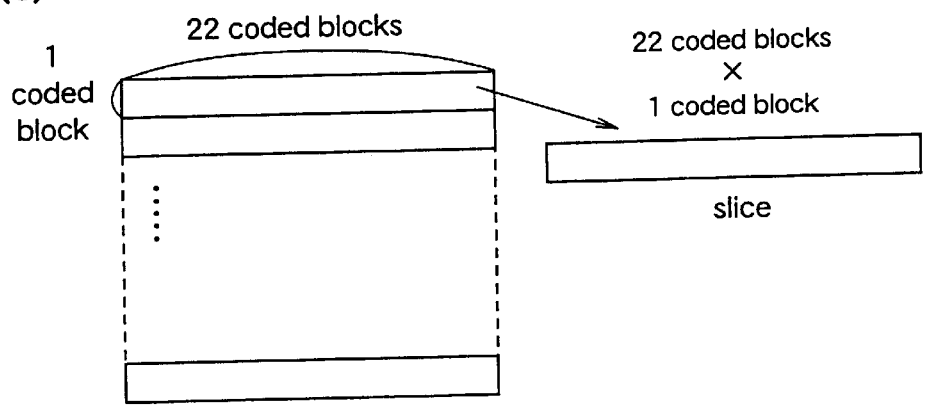

FIG. 3 is a diagram showing an example of a format of digital image data in the image processing apparatus according to the first embodiment. The digital image data output from the A/D converter 101 possessed by the image processing apparatus according to this first embodiment is discrete unit digital data, and it is an array of pixels having pixel values each showing a luminance signal or a color difference signal of an image. As shown in FIG. 3(a), one frame comprises 352×240 pixels. FIG. 3(b) shows coded blocks, each coded block being a processing unit of coding by the encoder 104 and comprising 16×16 pixels. As shown in the figure, one frame of digital image data comprises 22 coded blocks in the horizontal direction and 15 coded blocks in the vertical direction. FIG. 3(c) shows slices, each slice being an input/output unit of digital image data according to this first embodiment. One slice is one array of coded blocks in the horizontal direction. As shown in the figure, one slice comprises 22 coded blocks in the horizontal direction and 1 coded block in the vertical direction, and one frame comprises 15 slices.

In this first embodiment, input/output of digital image data in/from the input image memory 105 is managed in units of slices. Therefore, each of the unit storage amount and the unit processing amount is one slice.

Hereinafter, a description will be given of the operation of the image processing apparatus according to the first embodiment constructed as shown in FIGS. 1 and 2. In the initial state, since system reset is performed, the count values of the write block counter 201 (FIG. 2) and the read block counter 202 (FIG. 2) possessed by the flag generator 107 (FIG. 1) become 0, and the carry flag holder 203 (FIG. 2) and the error flag holder 209 (FIG. 2) are in their reset states. Accordingly, the error flag S162 output from the flag generator 107 shown in FIG. 1 is in the ineffective state, namely, the Lo state.

In the initial state, the flag generator 107 shown in FIG. 2 operates as follows. The signal S251 indicating 0 is output from the write block counter 201 to the adder 205. In this case, since the carry flag holder 203 is in the reset state, the signal S253 is in the Lo state, 0 is selected in the selector 204, and the signal S255 indicating 0 is output to the adder 205. In the adder 205, the signal S251 (0) and the signal S255 (0) are added, and the signal S256 indicating 0 which is the result of the addition is output to the subtracter 206 on the other hand, from the read block counter, the signal S252 indicating the count value 0 is output to the subtracter 206. The subtracter 206 subtracts the signal S252 (0) from the signal S256 (0), and outputs the signal S257 indicating 0 which is the result of the subtraction, to the comparators 207 and 208.

The comparator 207 compares the signal S257 (0) with the signal S258a indicating the constant 15. Since these signals do not match, the comparator 207 does not perform the setting operation for the error flag holder 209. Therefore, the error flag holder 209 remains in the reset state, and the output error flag S162 remains in the Lo state.

On the other hand, in the comparator 208, the signal S257 (0) is compared with the signal S258b indicating the constant 0. Since these signals match, the comparator 208 outputs the signal S260 indicating "match" to the empty flag holder 210. Thereby, the empty flag holder 210 outputs the empty flag S165 in the Hi state.

The empty flag S165 in the Hi state means that digital image data to be coded is not stored in the input image memory 105. The empty flag S165 is input to the encoder 104 as shown in FIG. 1, and the encoder 104 does not perform coding when the empty flag S165 is in the Hi state. Accordingly, the encoder 104 is in the stand-by state until a prescribed amount of data is stored in the input image memory 105.

As shown in FIG. 1, when the analog video signal S151 is input to the image processing apparatus, the analog video signal S151 is input to the A/D converter 101 and subjected to analog/digital conversion. The A/D converter 101 outputs the digital image data S152 so generated to the image input controller 102. The image input controller 102 reads the error flag S162 supplied from the flag generator 107. As described above, since the error flag S162 is in the ineffective state (Lo state), the image input controller 102 generates an image input enabling signal S161 corresponding to the input digital image data S152 as a signal indicating "effective" (Hi state), and outputs the digital image data S153 and the image input enabling signal S161 to the memory controller 103.

Since the image input enabling signal S161 indicates "effective", the memory controller 103 stores the corresponding digital image data S152 in the input image memory 105. As already described with respect to FIG. 3, input/output of the digital image data in/from the input image memory is carried out in slice units (FIG. 3(c)). So, when the memory controller 103 has stored one slice of digital image data in the input image memory, it generates a writing end signal S164 to be output to the flag controller 107.

In the flag generator 107, the writing end signal S164 is input to the write block counter 201 as shown in FIG. 2, and the write block counter performs the count-up operation to increase its count value by 1. In the figure, since the count value of the write block counter 201 changes from 0 to 1, the signal S251 indicating 1 is output from the write block counter 201 to the adder 205. Since the carry flag holder 203 remains in the reset state, 0 is selected in the selector 204 according to the signal S253 indicating the reset state, and the signal S255 indicating 0 is output to the adder 205. In the adder 205, the signal S251 (1) and the signal S255 (0) are added, and the signal S256 indicating 1, which is the result of the addition, is output to the subtracter 206. On the other hand, the count value of the read block counter is 0, and so the signal S252 indicating 0 is output to the subtracter 206. The subtracter 206 subtracts the signal S252 (0) from the signal S256 (1), and outputs the signal S257 indicating 1, which is the result of the subtraction, to the comparators 207 and 208.

The comparator 207 compares the signal S257 (1) with the signal S258a indicating the constant 15. Since these signals do not match, the comparator 207 does not perform the setting operation for the error flag holder 209. Accordingly, the error flag holder 209 remains in the reset state, and the output error flag S162 remains in the Lo state.

On the other hand, the comparator 208 compares the signal S257 (1) with the signal S258b indicating the constant 0. Since these signals do not match, the comparator 208 outputs the signal S260 indicating "mismatch" to the empty flag holder 210. Thereby, the empty flag holder 210 outputs the empty flag S165 in the Lo state.

Turning to FIG. 1, the empty flag S165 in the Lo state is input to the encoder 104. Since the empty flag S165 in the Lo state indicates that digital image data to be subjected to coding is stored in the input image memory 105, the encoder 104 executes coding when detecting this flag. The digital image data stored in the input image memory 105 is read by the encoder 104 through the memory controller 103. The encoder 104 codes the input digital image data S155 to generate coded data S156, and outputs the data to the rate buffer 106. From the rate buffer 106, the coded data S157 is output at a constant rate to the outside of the image processing apparatus.

On the other hand, when coding of the one slice of digital image data has been completed, the encoder 104 generates a coding end signal S166 indicating the completion, and outputs this signal to the flag generator 107. In the flag generator 107, the coding end signal S166 is input to the read block counter 202 as shown in FIG. 2, and the read block counter 202 performs the count-up operation to increase its count value by 1.

Thereafter, the image input controller 102 checks the state of the error flag S162, and the digital image data is continuously stored in the input image memory 105 as long as the error flag is in the Lo state. On the other hand, the encoder 104 checks the state of the empty flag S165 every time one slice of digital image data is coded. When the empty flag is in the Lo state, the encoder 104 reads the digital image data stored in the in put image memory 105 and codes the data.

In the flag generator 107, the write block counter 201 shown in FIG. 2 performs the count-up operation every time the writing end signal S164 output from the memory controller 103 (FIG. 1) is input thereto. When the count value has reached 14 and a further writing end signal S164 has been input, the write block counter 201 instructs the carry flag holder 203 to be in the set state, and sets its own count value to 0. In other words, the carry flag holder 203 goes into the set state when the count value of the write block counter 201 becomes 15 which is equal to the number of slices constituting one frame (FIG. 3(c)).

The read block counter 202 shown in FIG. 2 performs the count-up operation every time the coding end signal S166 output from the encoder 104 (FIG. 1) is input thereto. When the count value has reached 14 and a further coding end signal S166 has been input, the read block counter 202 instructs the carry flag holder 203 to be in the reset state, and sets its own count value to 0. In other words, the carry flag holder 203 goes into the reset state when the count value of the read block counter 202 becomes 15 which is equal to the number of slices constituting one frame (FIG. 3(c)).

When the carry flag holder 203 is in the set state, as the signal S253 is in the Hi state, the selector 204 selects the signal S254b indicating 15 and outputs the signal S255 indicating 15 to the adder 205. In this case, in the adder 205, 15 is added to the count value of the write block counter 201, and the result of the addition S256 is output to the subtracter 206.

The result obtained in the subtracter 206 is a difference between "the number of slices stored in the input image memory 105" (S251=S256) and "the number of slices coded by the encoder 104" (S252) when the carry flag holder 203 is in the reset state. On the other hand, when the carry flag holder 203 is in the set state, the result is a difference between "the number of slices stored in the input image memory 105+15" (S251+15=S256) and "the number of slices coded by the encoder 104" (S252). When this difference is 0, the empty flag S165 is in the Hi state, and the coding by the encoder 104 is stopped. When the difference is 15, the error flag S162 is in the Hi state, and the image input controller 102 generates an image input enabling signal S161 indicating "ineffective", and therefore storage of digital image data in the input image memory is not carried out.

Figure 4:
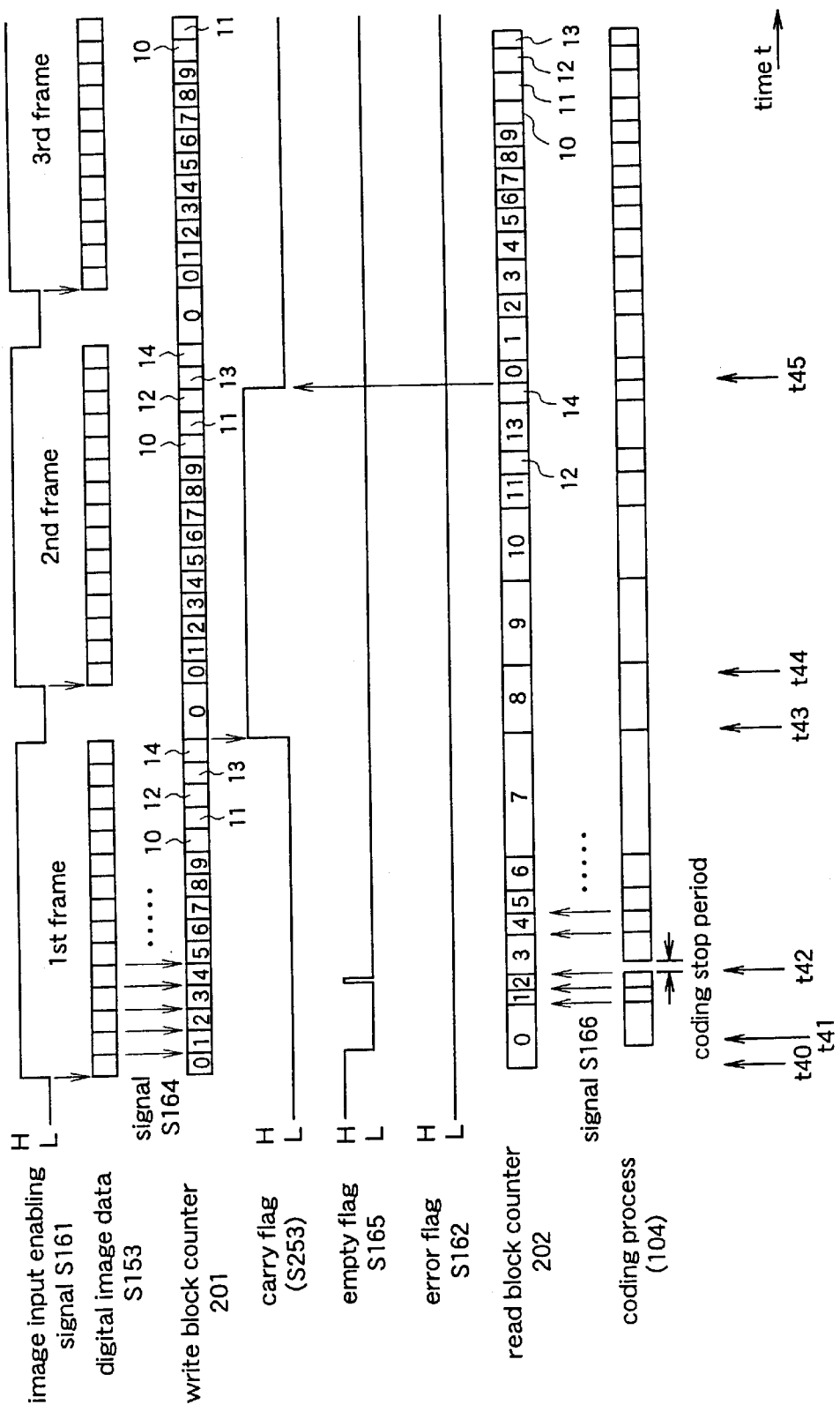
FIGS. 4 and 5 are timing charts for explaining the processing by the image processing apparatus according to the first embodiment.
Figure 5:
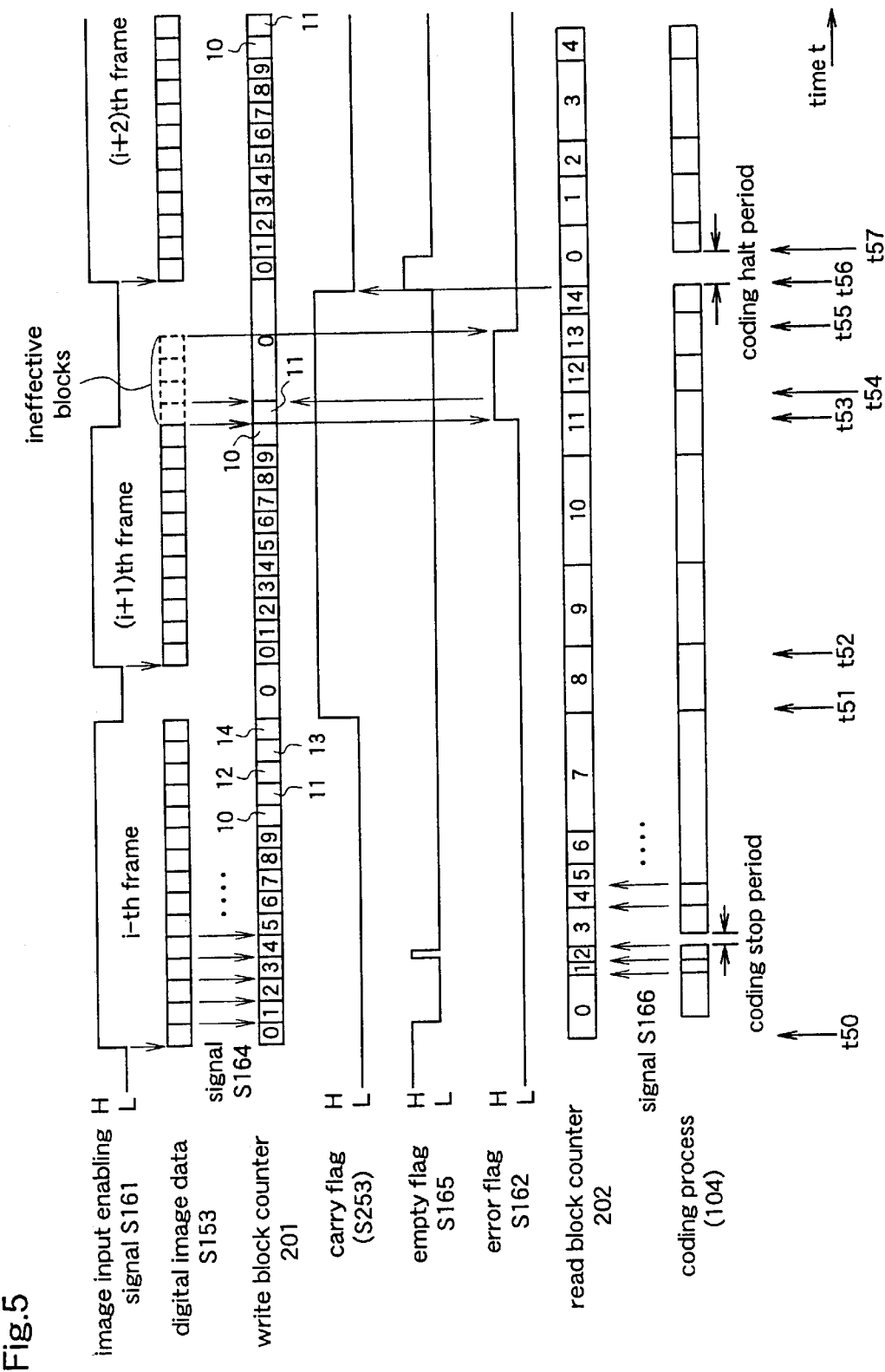

FIGS. 4 and 5 are timing charts showing examples of processing states of the image processing apparatus according to the first embodiment. In FIGS. 4 and 5, "image input enabling signal S161" is a signal generated by the image input controller 102 to be output to the memory controller 103 in FIG. 1, and its Hi state indicates "effective" and instructs storage of digital image data in the input image memory while its Lo state indicates "ineffective" and does not instruct storage of digital image data in the input image memory 105. "Digital image data S153" indicates digital image data in slice units to be output to the memory controller 103 together with the image input enabling signal S161.

In FIGS. 4 and 5, "write block counter 201" indicates the count value possessed by the write block counter 201 in FIG. 2. The write block counter 201 counts the writing end signal S164 which is output from the memory controller 103 shown in FIG. 1 and indicates that storage of digital image data for each slice has been performed, and the count value corresponds to the number of slices of digital image data stored in the input image memory 105.

In FIGS. 4 and 5, "carry flag (S253)" indicates the state of the signal S253 indicating whether the carry flag holder 203 is in the set state or in the reset state, in FIG. 2. As described above, the signal S253 is in the Hi state when the holder 203 is in the set state while it is in the Lo state when the holder 203 is in the reset state, and this signal controls the selection of the selector 204.

In FIGS. 4 and 5, "empty flag S165" indicates the state of a signal which is generated by the flag generator 107 and output to the encoder 104 in FIG. 1, and its Hi state indicates that no digital image data to be coded is stored in the input image memory 105, and instructs the encoder 104 to stop coding. Its Lo state indicates that digital image data to be coded is stored in the input image memory 105, and instructs the encoder 104 to execute coding.

In FIGS. 4 and 5, "error flag S162" indicates the state of a signal which is generated by the flag generator 107 and output to the image input controller 102 in FIG. 1, and its Hi state indicates overflow in the input image memory 105, and instructs the image input controller 102 to generate an image input enabling signal indicating "ineffective" (to stop storage of data in the input image memory 105). Its Lo state indicates that storage of data in the input image memory 105 is possible, and instructs the image input controller 102 to generate an image input enabling signal indicating "effective" (to execute storage of data in the input image memory 105).

In FIGS. 4 and 5, "read block counter 202" indicates the count value held by the read block counter 202, in FIG. 2. The read block counter 202 counts the coding end signal S166 which is output from the encoder 104 shown in FIG. 1 and indicates that coding for each slice has been performed, and the count value corresponds to the number of slices of digital image data which have been coded.

In FIGS. 4 and 5, "coding process (104)" indicates the coding process in slice units performed by the encoder 104. The time required for coding of digital image data significantly varies according to the characteristics of the image and, therefore, there are both cases where the time required for processing one slice is long and where it is short, as shown in FIGS. 4 and 5.

Hereinafter, the image processing by the image processing apparatus according to the first embodiment will be described along the timing chart of FIG. 4.

Since no effective region of the image is input until timing t40 shown in FIG. 4, the image input controller 102 outputs the image input enabling signal S161 in the Lo state, and storage of digital image data is not carried out. From timing t40, the first frame of digital image data S153 is input to be processed. Since the error flag S162 is in the Lo state in the initial state, the image input controller 102 generates an image input enabling signal S161 in the Hi state indicating "effective", so that the digital image data S153 is stored in the input image memory 105.

Every time one slice of data is stored, the memory controller 103 outputs a writing end signal S164 to the flag generator 107, and the write block counter 201 possessed by the flag generator 107 performs the count-up operation corresponding to the signal S164. Here, every time the slices constituting the digital image data of the first frame (15 slices from 0 to 14) are input, the count value increases to 14.

At timing t41 when one slice of the digital image data S153 has been stored, the count value of the write block counter 201 changes from 0 to 1 as described above, whereby the empty flag changes from the Hi state to the Lo state. Accordingly, the encoder 104, detecting that the empty flag is in the Lo state, reads the digital image data stored in the input image memory 105 to code the data. Every time coding of one slice has ended, a coding end signal S166 is output, and the read block counter 202 possessed by the flag generator 107 performs the count-up operation corresponding to the signal S166.

Between timing t41 and timing t42, coding is carried out speedily and, immediately after t42, the input image memory 105 enters in the state where the digital image data to be subjected to coding has not yet been completely stored therein. In this case, since the value of the signal S257 output from the subtracter 206 shown in FIG. 2 becomes 0, the empty flag in the Hi state is output according to the result of the comparison in the comparator 208. Therefore, as shown in FIG. 4, the encoder 104 stops coding. Here, when the next slice is stored in the input image memory 105, the empty flag S165 returns to the Lo state, and coding is resumed.

Until timing t43, the first frame of digital image data S153 has been stored in the input image memory 105. At this time, since the write block counter 201 receives the writing end signal S164 while it holds the count value 14, the counter 201 instructs the carry flag holder 203 shown in FIG. 2 to be in the set state and sets its own count value to 0. Thereby, the signal S253 output from the carry flag holder 203 goes into the Hi state, and in the adder 205, 15 is added to the count value of the write block counter 201.

At timing t44, the second frame of digital image data S153 is input. Since the error flag S162 remains in the Lo state, the image input controller 102 outputs the image input enabling signal S161 indicating "effective", whereby the first slice of the input digital image data is stored so that it overwrites the already coded slice of digital image data in the first frame, under control of the memory controller 103. The subsequent slices of the digital image data S153 are also stored in the input image memory 105 so that these slices overwrite the already coded slices. Thereafter, at timing t45, the encoder 104 completes coding of the digital image data in the first frame. The read block counter 202 (count value 14) receiving the coding end signal S166 at this time resets the carry flag holder 203 shown in FIG. 2 and sets its own count value to 0. Therefore, the signal S253 shown in FIG. 4 goes into the Lo state, and in the adder 205 the value to be added to the write block counter 201 is changed from 15 to 0.

As described above, in the image processing apparatus of the first embodiment, even when the input image memory 105 having a capacity for one frame comes into the state where one frame of data has already been stored, the subsequent one frame of data is processed so that it overwrites in slice units, in contrast with the prior art image processing apparatus in which one frame of data is immediately discarded. To be specific, in the prior art image processing apparatus, the second frame of digital image data shown in FIG. 4 is discarded without being coded. However, in the image processing apparatus according to the first embodiment, the second frame of data is not discarded but coded according to the above-mentioned processing.

However, also in the image processing apparatus of this first embodiment, there is a case where digital image data is discarded according to control using an error flag. FIG. 5 is a diagram for explaining processing in this case.

In FIG. 5, from timing t50, the i-th frame of digital image data S153 is stored in the input image memory 105 and, thereafter, the encoder 104 starts coding. At timing t51, storage of the i-th frame of digital image data S153 is completed. As in the case shown in FIG. 4, the signal S253 output from the carry flag holder 203 goes into the Hi state and, from timing t52, the (i+1)th frame of digital image data is stored so that it overwrites the already coded data. At timing t53, the 11th slice of data in the (i+1)th frame is to be stored, but coding of the 11th slice of data in the i-th frame has not yet been completed at this point of time.

In such case, in FIG. 2, the count value 11 of the write block counter and the value 15 output from the selector 204 are added by the adder 205, and the value 26 (signal S256) is output to the subtracter 206. On the other hand, the count value of the read block counter 202 becomes 11, and the signal S252 indicating 11 is output to the subtracter 206. The result obtained by the subtracter 206 becomes 26−11=15, and the signal S257 having the value 15 is output to the comparator 207, whereby the error flag S162 goes into the Hi state. Since the error flag S162 is Hi as shown in FIG. 5, the image input controller 102 sets the image input enabling signal S161 in the Lo state indicating "ineffective". So, the digital image data is discarded without being stored in the input image memory 105. Accordingly, the 11th and subsequent slices of digital image data in the i-th frame, for which coding has not completed yet, are stored without being overwritten.

At timing t54, the image input controller 102 outputs the counter reset signal S163 to the flag generator 107. The write block counter 201 shown in FIG. 2 sets the count value to 0 in response to the signal S163a. The number of slices of digital image data stored in the input image memory 105 indicates the number of remaining slices which have not yet been coded, amongst the slices constituting the i-th frame of digital image data.

Timing t55 is the timing at which storage of the (i+1)th frame of digital image data ought to be completed if the processing has been carried out normally. At this point of time, the image input controller 102 shown in FIG. 1 outputs the error reset signal S163 to the flag generator 107. As shown in FIG. 2, the error reset signal S163b is input to the error flag holder 209, whereby the state of the error flag holder 109 is changed from the set state to the reset state. Accordingly, the error flag output from the flag generator 107 changes from the Hi state to the Lo state.

Further, at timing t56, the read block counter 202 holding the count value 14 receives the coding end signal S166, and it changes the state of the carry flag holder 203 to the reset state and sets its own count value to 0. Accordingly, the signal S253 output from the carry flag holder 203 changes from the Hi state to the Lo state, and 0 is added in the adder 205 shown in FIG. 2. Accordingly, both of the signal S256 and the signal S252 become 0 and the signal S257 becomes 0, whereby the empty flag S165 in the Hi state is output.

In response to this, the encoder 104 stops coding and, as shown in FIG. 5, the coding stop period continues until the subsequent data is stored.

At timing t57, the (i+2)th frame of digital image data S153 is stored in the input image memory 105. Thereby, in FIG. 2, the count value of the write block counter 201 changes from 0 to 1, and the value of the signal S257 changes from 0 to 1, whereby the empty flag S165 in the Lo state is output. Accordingly, as shown in FIG. 5, on and after timing t57 when the empty flag S165 goes in the Lo state, coding by the encoder 104 is resumed to process the (i+2)th frame of data.

In the image processing apparatus according to the first embodiment, since the overwrite storage in slice units is carried out as shown in FIG. 4, the second frame of digital image data is not discarded even when coding is delayed. However, as shown in FIG. 5, when the delay increases and the overwrite storage in slice units adversely affects the unprocessed data in the i-th frame, the (i+1)th frame of data is not subjected to coding in the above-described processing to protect the i-th frame of data, and subsequently the (i+2)th frame of data is subjected to coding.

As described above, since the image processing apparatus according to the first embodiment is provided with the flag generator 107 which holds a carry flag in it and generates an error flag and an empty flag, the encoder 104 starts coding in accordance with the state of the empty flag. Therefore, the coding can be started when one slice of digital image data has been stored in the input image memory 105, whereby a delay until starting the coding can be reduced as compared with the prior art image processing apparatus which requires storage of data in one frame (in the image format shown in FIG. 3, 15 slices), resulting in an image processing apparatus suitable for the real-time use.

A description is now given of comparison of delays between the image processing apparatus according to the first embodiment and the image processing apparatus according to the prior art. According to general conditions, it is assumed that the target to be processed is according to the NTSC (1 line=about 63.5 us) system, the image size to be stored in the input image memory is 352 pixels×240 pixels (352 pixels×240 lines) for one frame, and the slice size (the processing unit of the first embodiment) is 352 pixels×16 pixels (352 pixels×16 lines) for one slice. In this case, in the prior art image processing apparatus, the time required for storing one frame of image data in the input image memory is 240 lines×63.5 us, that is, about 15 ms.

Since coding is not started until one frame of data has been stored as described above, the delay time from which image capture is started to when coding is started is about 15 ms. On the other hand, in the image processing apparatus according to the first embodiment, the time required for storing one slice of image data in the input image memory is 16 lines×63.5us, that is, about 1 ms. This "about 1 ms" is the delay time until when coding is started and, therefore, the delay is significantly reduced as compared with the prior art.

Further, since the input image memory 105 is managed in slice units, a memory capacity enough to store one frame suffices. Since this capacity is smaller than that of the prior art image processing apparatus which requires a capacity enough to store at least two frames, the device cost can be reduced.

Furthermore, since the flag generator 107 holds a carry flag, overwrite in slice units can be performed on the input image memory 105. So, even when coding is delayed, the possibility of frame discard is reduced, resulting in improved image quality.

Embodiment 2

An image processing apparatus according to a second embodiment of the invention controls image processing by using control flags as in the first embodiment, but this second embodiment employs the number of remaining block units in place of the empty flag employed in the first embodiment.

Figure 6:
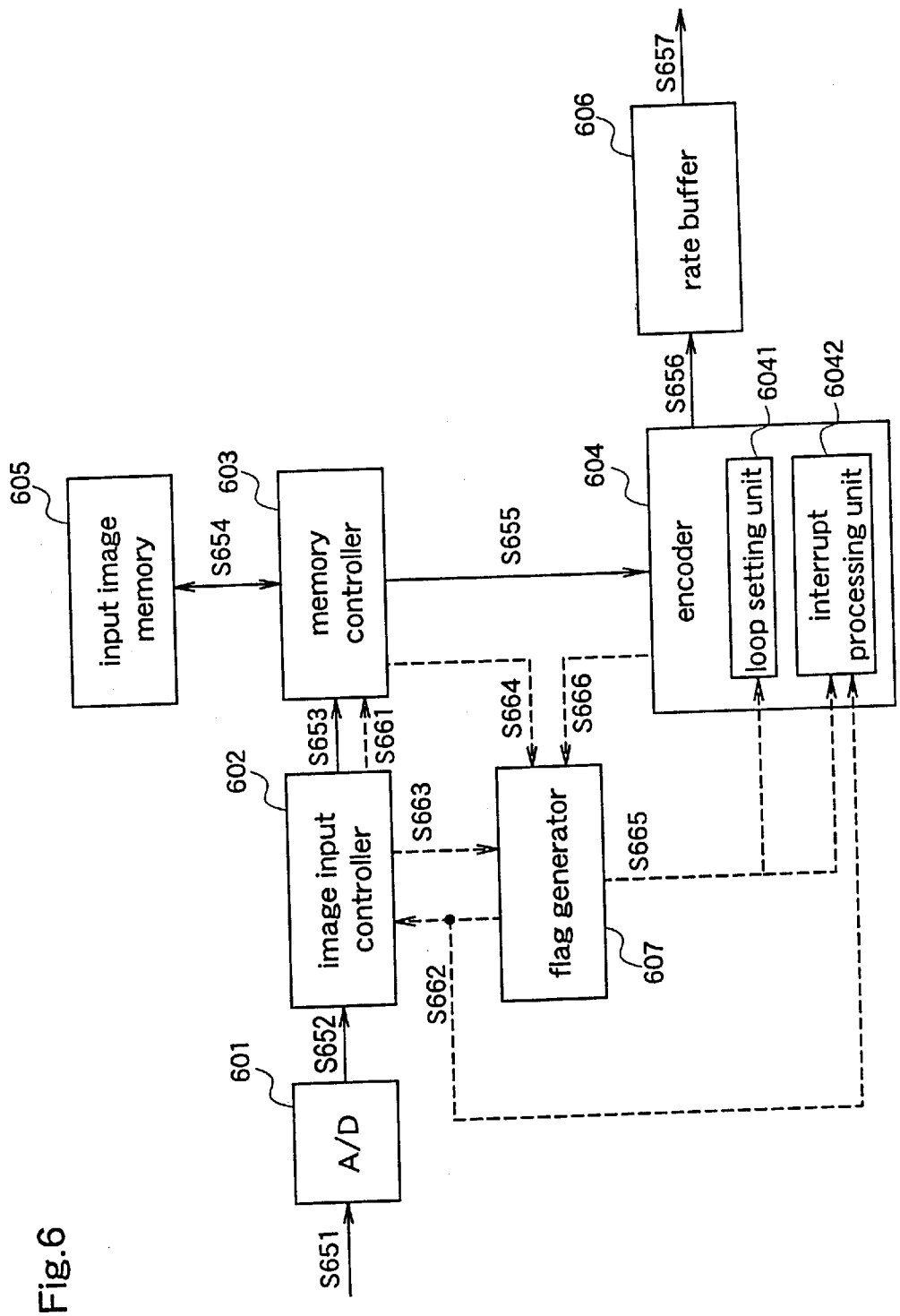
FIG. 6 is a block diagram illustrating the structure of an image processing apparatus according to a second embodiment of the present invention.

FIG. 6 is a block diagram illustrating the structure of an image processing apparatus according to the second embodiment. As shown in the figure, the image processing apparatus according to the second embodiment comprises an A/D converter 601, an image input controller 602, a memory controller 603, an encoder 604, an input image memory 605, a rate buffer 606, and a flag generator 607. This apparatus receives an analog video signal S651 and outputs coded data S657. The encoder 604 of the image processing apparatus according to this second embodiment includes a loop setting unit 6041 and an interrupt processing unit 6042. As in FIG. 1 of the first embodiment, signals shown by solid lines are data to be processed, and signals shown by broken lines are signals for control.

The image input controller 602 generates an image input enabling signal indicating whether the input digital image data is effective or ineffective. The image input controller 602 of this second embodiment generates an image input enabling signal according to the distinction between the effective region and the ineffective region of the digital image data as in the case of the prior art image processing apparatus. Further, it refers to an error flag supplied from the flag generator 607 described later, like the input image controller 102 of the first embodiment. Also in this second embodiment, as in the first embodiment, the image input controller 602 generates an image input enabling signal indicating "effective" when the error flag is ineffective (Lo state), and generates an image input enabling signal indicating "ineffective" when the error flag is effective (Hi state).

The encoder 604 subjects the digital image data to a predetermined compressive coding process to generate coded data. The loop setting unit 6041 included in the encoder 604 sets the loop number indicating the number of coding processes to be executed continuously, according to the remaining block number S665 supplied from the flag generator 607 described later. The interrupt processing unit 6042 included in the encoder 604 resets the loop number possessed by the loop setting unit 6041, according to the error flag supplied from the flag generator 607. The encoder 604 of this second embodiment does not perform coding when the value of the remaining block number S665 is 0. When it is not 0, the encoder 604 successively codes the digital image data in the slice number equivalent to the loop number of the loop setting unit 6041. Like the encoder 104 according to the first embodiment, the encoder 604 outputs a coding end signal S666 to the flag generator 607 every time coding of one slice is completed.

The flag generator 607 counts the writing end signal for each slice supplied from the memory controller 603 and the coding end signal for each slice supplied from the encoder 604 and, according to the result of the counting, it generates flags (remaining block number and error flag) used for controlling data input/output in/from the memory. The flag generator 607 according to this second embodiment generates continuous process information (remaining block number) indicating how many times the coding of the unit processing amount (one slice) can be continuously executed by the coding device (the encoder 604).

The A/D converter 601, the memory controller 603, the input image memory 605, and the rate buffer 606 are identical to 101, 103, 105, and 106 according to the first embodiment, respectively.

Figure 7:
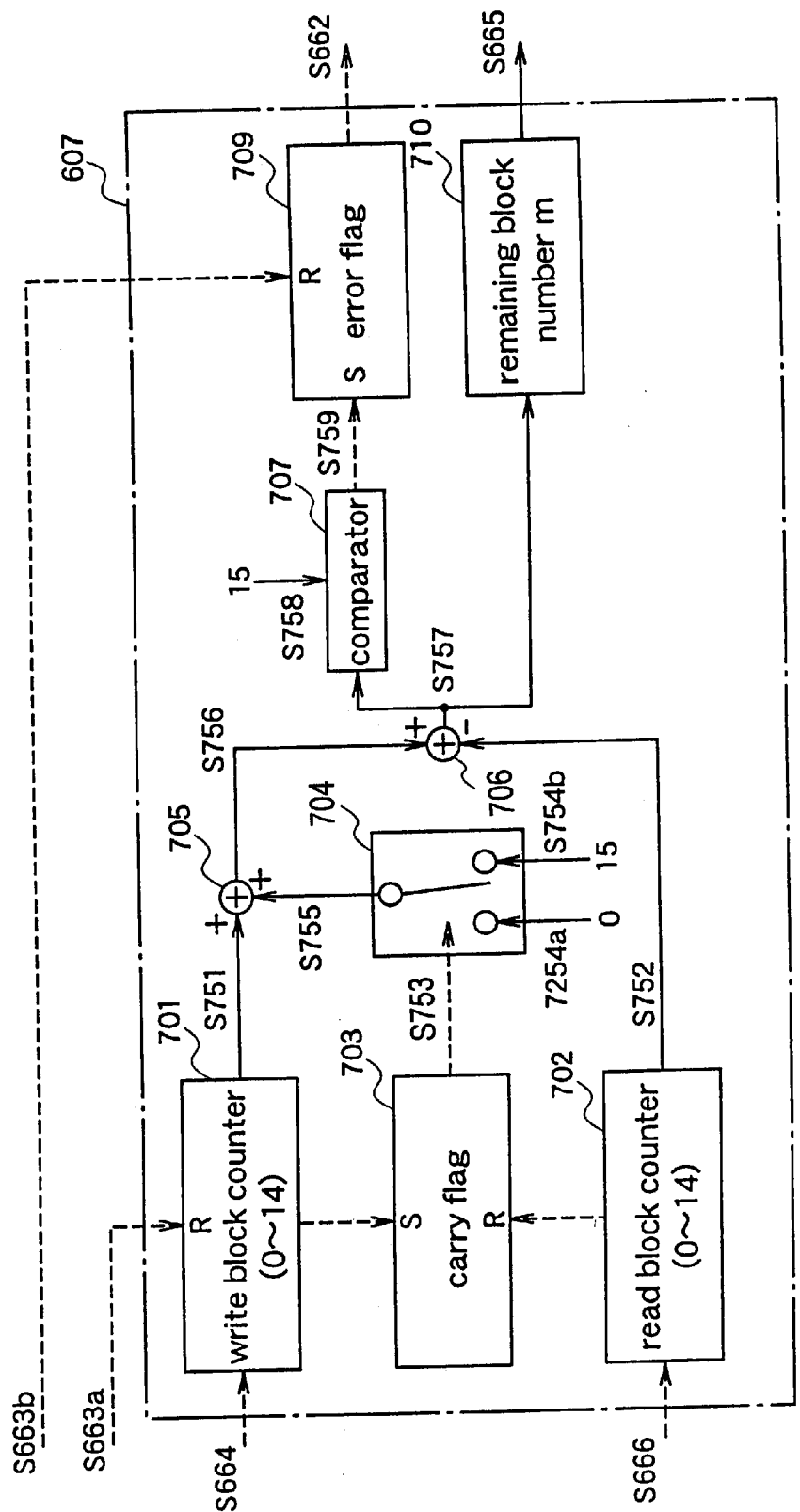
FIG. 7 is a block diagram illustrating the internal structure of a flag generator included in the image processing apparatus according to the second embodiment.

FIG. 7 is a block diagram illustrating the internal structure of the flag generator 607 (FIG. 6). As shown in the figure, the flag generator 607 comprises a write block counter 701, a read block counter 702, a carry flag holder 703, a selector 704, an adder 705, a subtracter 706, a first comparator 707, an error flag holder 709, and a remaining block number holder 710. The remaining block number holder 710 holds the result output from the subtracter 706 as a remaining block number (m) which indicates, in slice units, the amount of digital image data to be subjected to coding.

The write block counter 701, the read block counter 702, the carry flag holder 703, the selector 704, the adder 705, the subtracter 706, the first comparator 707, and the error flag holder 709 are identical to those (201-207, and 209) shown in FIG. 2 according to the first embodiment.

Hereinafter, a description will be given of the operation of the image processing apparatus of the second embodiment so constructed. Also in this second embodiment, as in the first embodiment, the image data shown in FIG. 3 is used as a target to be processed.

In the initial state, system reset is performed as in the first embodiment, whereby the count values of the write block counter 701 (FIG. 7) and the read block counter 702 (FIG. 7) possessed by the flag generator 607 (FIG. 6) become 0, and the carry flag holder 703 (FIG. 7) and the error flag holder 709 (FIG. 7) are in the reset state. Accordingly, the error flag S662 in the ineffective state, i.e., the Lo state, is output. Further, since the count value of the write block counter 701 is 0, the values of the signals S751, S756, and 5757 are 0. Accordingly, the remaining block number m possessed by the remaining block number holder is 0, and a signal S665 indicating 0 is output to the encoder 604. The encoder 604 receiving the remaining block number S665 does not perform coding because the value of this signal is 0.

As shown in FIG. 6, when the analog video signal S651 is input to the image processing apparatus, this analog video signal S651 is input to the A/D converter 601, wherein it is subjected to analog/digital conversion. The A/D converter 601 generates digital image data S652 and outputs this data to the image input controller 602. Since the error flag S662 is in the ineffective state (Lo state), the image input controller 602 generates an image input enabling signal S661 corresponding to the input digital image data S652 as a signal indicating "effective" (Hi state), and outputs both of the digital image data S653 and the image input enabling signal S661 to the memory controller 603. Since the image input enabling signal S661 indicates "effective", the memory controller 603 stores the corresponding digital image data S652 in the input image memory 605. When one slice of data has been stored, the memory controller 603 outputs the writing end signal S664 to the flag generator 607.

In the flag generator 607 shown in FIG. 7, since the count value of the write block counter 701 changes from 0 to 1, the values of the signals S751, S756, and S757 change from 0 to 1, and the remaining block number m changes from 0 to 1. The signal S665 indicating 1 is output to the encoder 604. Therefore, when the encoder 604 has ended coding for one slice, it outputs the coding end signal S666 to the flag generator 607.

When the encoder 604 receives the signal S665 indicating the remaining block number (m) is other than 0, it sets the value m as the loop number to the loop setting unit 6041 included in the encoder 604. When coding for one slice of digital image data has ended, the encoder 604 decreases the loop number by 1, and continuously performs coding on the next one slice of digital image data, without detecting the signal S665 indicating the remaining block number, until the loop number reaches 0. When the loop number becomes 0, the encoder 604 detects the signal S665 to obtain the remaining block number m, and sets the loop number.

Although the encoder 104 according to the first embodiment must detect the state of the empty flag each time one slice of digital image data is coded, the encoder 604 according to this second embodiment detects the signal S665 indicating the remaining block number only when the loop number has become 0 and, therefore, the frequency of detection is reduced, resulting in highly efficient processing.

Thereafter, the image input controller 602 checks the state of the error flag S662. While the error flag is in the Lo state, the digital image data is continuously stored in the input image memory 605. On the other hand, the encoder 604 executes coding as described above.

In response to the storage and coding of the digital image data, the count values of the write block counter 701 and the read block counter 702 of the flag generator 607 are updated, and the value of the signal S757 indicating a difference between them is regarded as the remaining block number m. Further, set and reset of the carry flag holder 703 are performed in like manner as described for the first embodiment. In the set state, in the adder 705, 15 is added to the count value of the write block counter 701. When the value of the signal S757 has become 15, the error flag S662 goes into the Hi state, and the input controller 602 generates an image input enabling signal indicating "ineffective" so that the digital image data is not stored in the input image memory.

Figure 8:
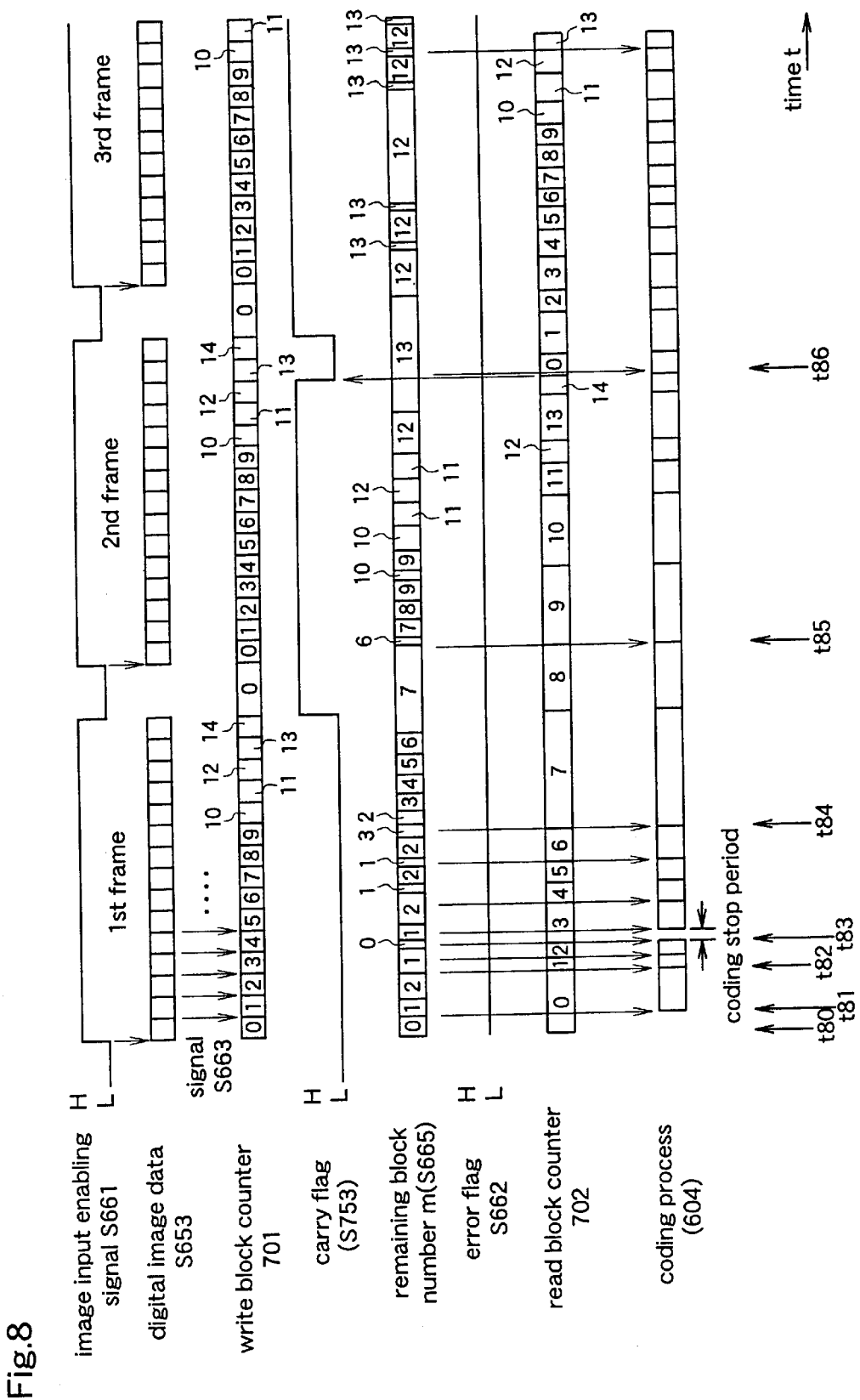
FIGS. 8 and 9 are timing charts for explaining the processing by the image processing apparatus according to the second embodiment.
Figure 9:
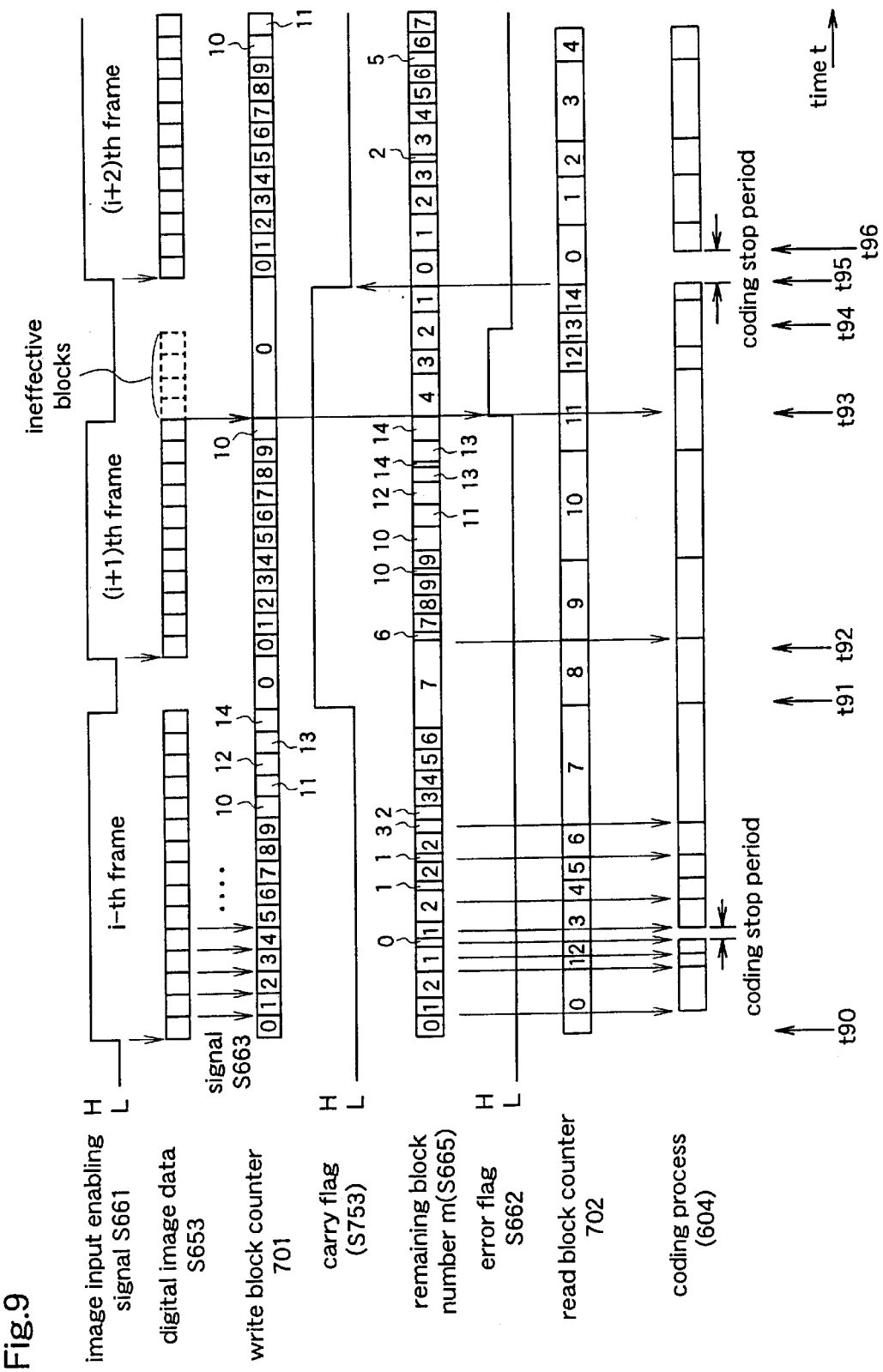
Figure 10:
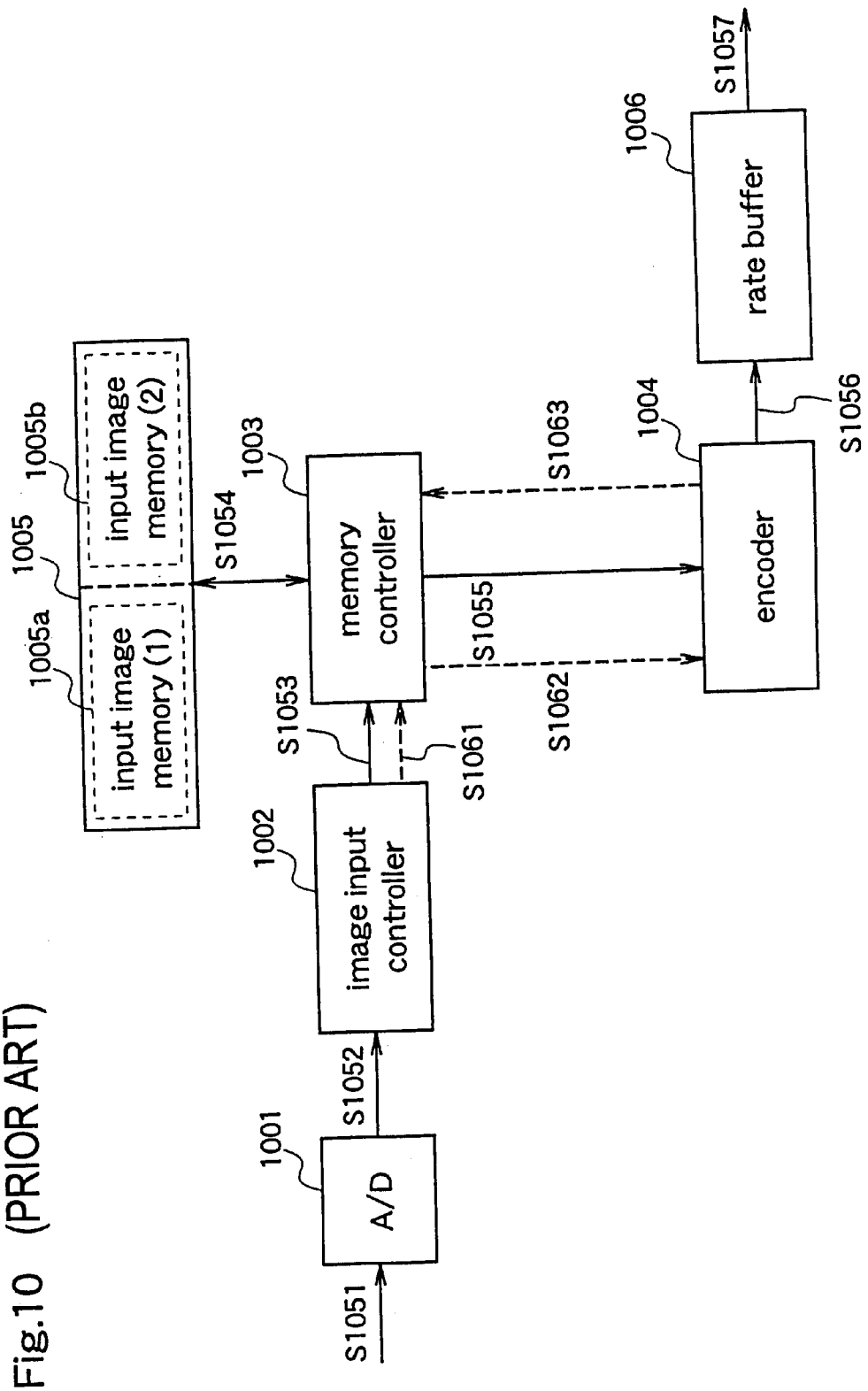
FIG. 10 is a block diagram illustrating the structure of an image processing apparatus according to the prior art.
Figure 11:
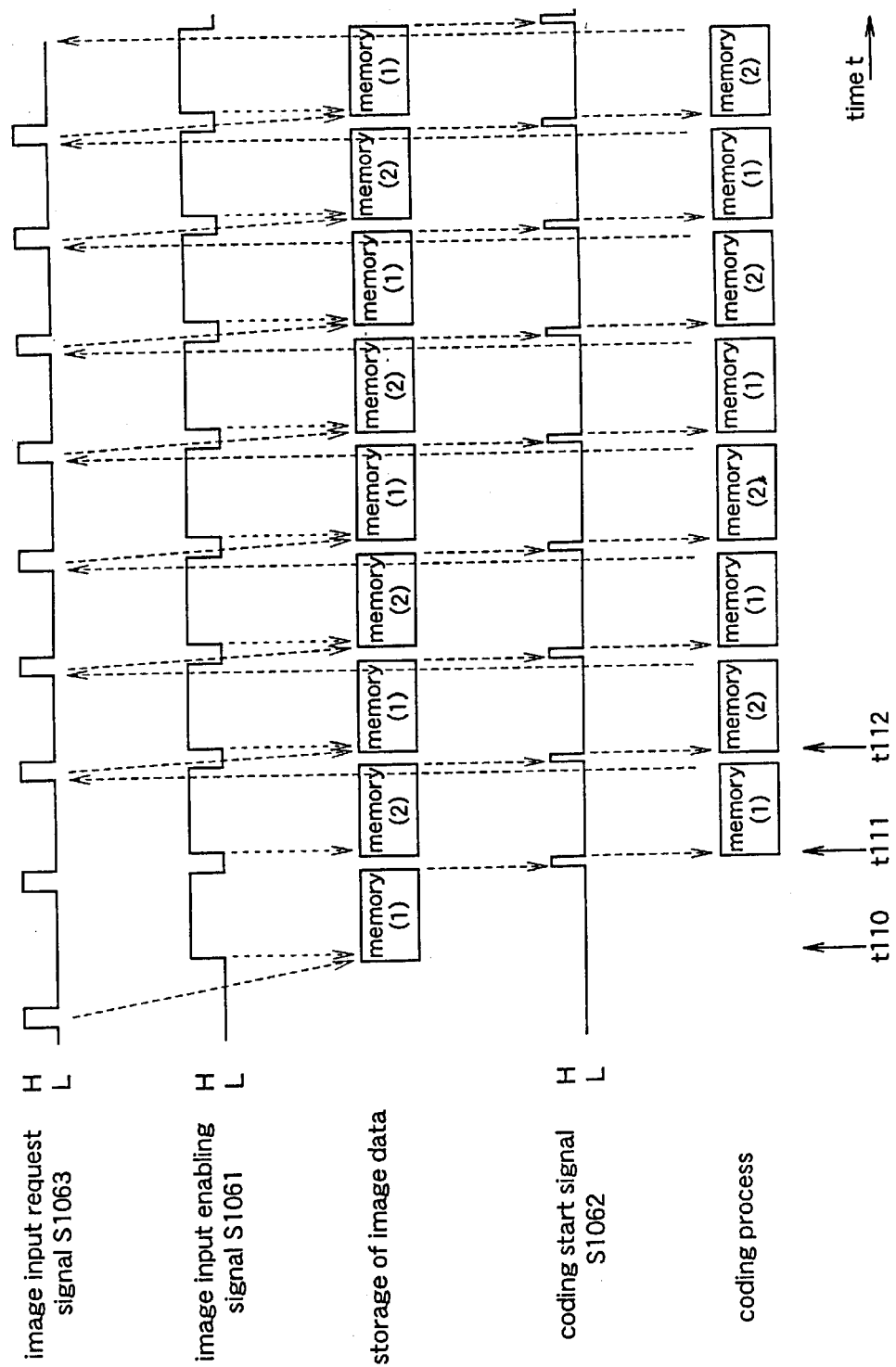
FIGS. 11 and 12 are timing charts for explaining the processing by the image processing apparatus according to the prior art.
Figure 12:
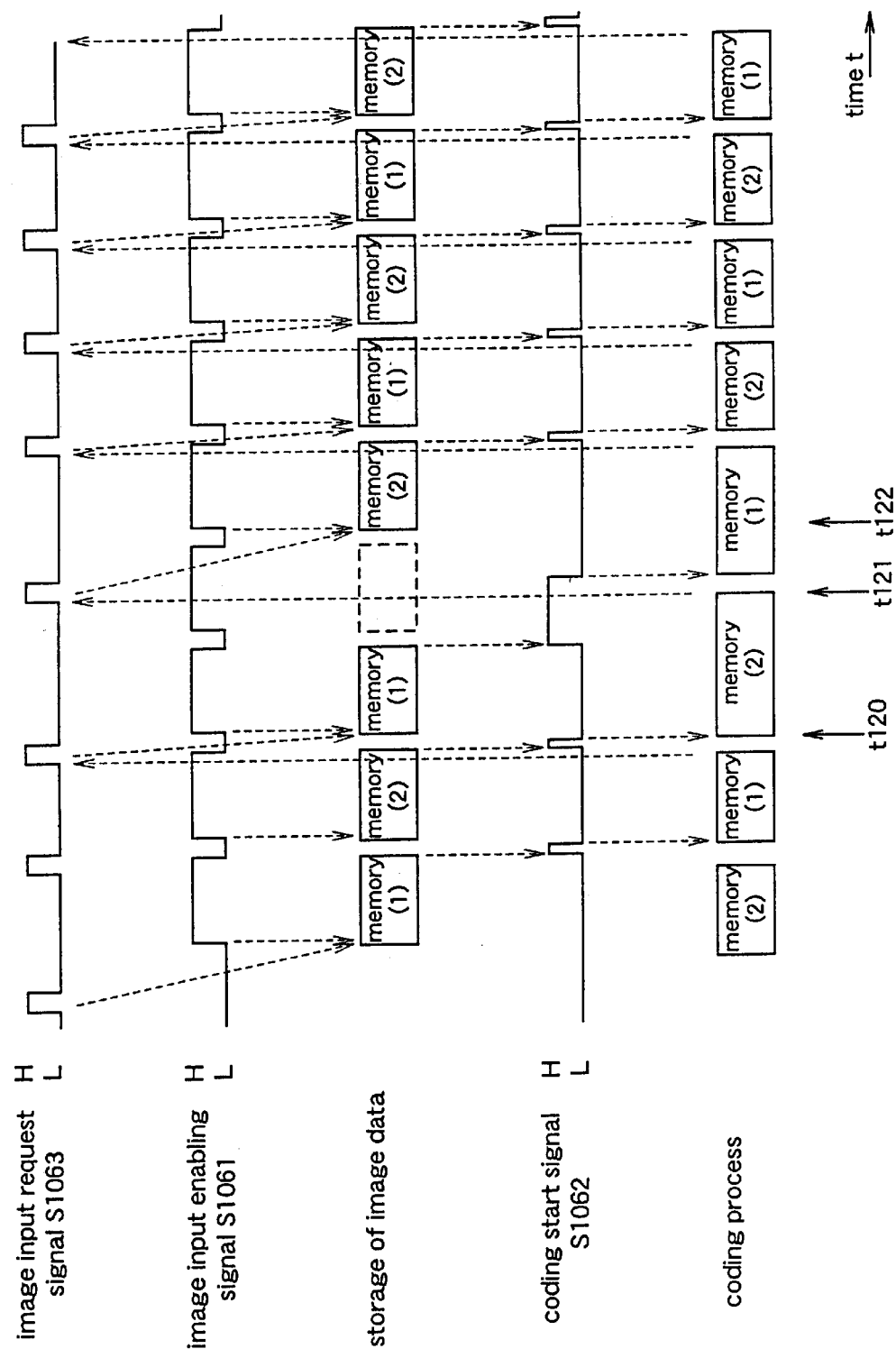

FIGS. 8 and 9 are timing charts showing examples of processing states of the image processing apparatus according to the second embodiment. In FIGS. 8 and 9, "remaining block number m" indicates the value of the signal S665 which is held by the remaining block number holder 710 shown in FIG. 7 and is output from the flag generator 607 to the encoder 604 in FIG. 6. In FIGS. 8 and 9, "image input enabling signal S661", "digital image data S653", "write block counter 701", "carry flag (S753)", "error flag S662", "read block counter 702", and "coding process (604)" are identical to those shown in FIGS. 4 and 5 according to the first embodiment.

Hereinafter, the image processing of the image processing apparatus according to the second embodiment will be described with reference to the timing chart of FIG. 8.

Since the effective region of the image has not been input until timing t80 shown in the figure, the image input controller 602 outputs the image input enabling signal S661 in the Lo state, and so storage of digital image data is not carried out. From timing t80, the first frame of digital image data S653 is input to be processed. In the initial state, since the error flag S662 is in the Lo state, the image input controller 602 generates an image input enabling signal S661 in the Hi state indicating "effective", whereby the digital image data S653 is stored in the input image memory 605. Each time one slice of data is stored, the writing end signal S664 is output from the memory controller 603 to the flag generator 607, and the write block counter 701 possessed by the flag generator 607 performs the count-up operation in response to the signal S664. To be specific, each time the slices constituting the first frame of digital image data (15 slices from 0 to 14) are input, the count value increases to 14.

At timing t81, the remaining block number m changes from 0 to 1. The encoder 604 receiving the signal S665 sets the loop number of 1 in the loop setting unit 6041, and performs coding on the one slice of digital image data. Then, the loop number is decreased by 1, and so the loop number is changed from 1 to 0. Since the loop number has become 0, the encoder 604 detects the signal S665 at timing t82 to obtain the remaining block number m.

Thereafter, coding is carried out speedily and, at timing t83, the remaining block number m becomes 0. The encoder 604, which has detected the signal S665 to obtain the remaining block number m, stops coding because m is 0. When the remaining block number m changes from 0 to 1, the encoder 604 detects the signal S665 indicating this change and then resumes the coding.

At timing t84, the encoder 604 obtains the remaining block number m=3. At this time, the loop number of 3 is set in the loop setting unit 6041. Then, the encoder 604 codes one slice of digital image data S163 stored in the input image memory 105 (the seventh slice in the first frame), and sets the loop number to 2 by decreasing it by 1. The encoder 604 codes the next one slice (the eighth slice) without detecting the signal S665, and sets the loop number to 1. Since the loop number is not 0, the encoder 604 codes the next one slice (the ninth slice) without detecting the signal S665, and sets the loop number to 0. Since the loop number has become 0, the encoder 604 detects the signal S665 to obtain 6 as the remaining block number m. Then, the loop number is set to 6, and the same processing as described above is repeated.

At timing t85, since the writing end signal S663 is input when the count value of the write block counter 701 is 14, the carry flag holder 703 goes into the set state, and the signal S753 becomes Hi. Thereby, in the flag generator 607, 15 is added to the count value of the write block counter 701, as described for the first embodiment.

Accordingly, as in the first embodiment, even when the second frame of digital image data is input though coding of the first frame of digital image data has not yet ended, the second frame of data is stored so that it overwrites the first frame of data in slice units, in contrast with the prior art image processing apparatus in which the second frame of data is discarded.

Thereafter, at timing t86, since the coding end signal S666 is input when the count value of the read block counter 702 is 14, the carry flag holder 703 goes into the reset state, whereby the signal S753 goes into the Lo state.

Also in the image processing apparatus of this second embodiment, as in the first embodiment, there is a case where the digital image data is discarded according to the control using an error flag, and FIG. 9 is a diagram for explaining the processing in this case.

In FIG. 9, from timing t90, the i-th frame of digital image data S653 is stored in the input image memory 605 and, thereafter, the encoder 604 starts coding. At timing t91, storage of the digital image data S653 in the i-th frame is completed. As in the case of FIG. 8, the signal S753 output from the carry flag holder 703 goes into the Hi state and, from timing t92, the (i+1)th frame of digital image data is stored so that it overwrite the already coded data, as in the case of FIG. 8. At timing t93, although the 11th slice of data in the (i+1)th frame ought to be stored, coding of the 11th slice of data in the i-th frame has not yet ended at this point of time.

In this case, as in the first embodiment described using FIG. 5, the error flag S662 goes in the Hi state, and the image input controller 602 sets the image input enabling signal S661 in the Lo state indicating "ineffective", and therefore the digital image data S653 is not stored in the input image memory 605. Accordingly, the 11th and subsequent slices of digital image data in the i-th frame, for which coding has not ended yet, are stored without being overwritten.

Further, as in the first embodiment, since the counter reset signal S663a is output, the count value of the write block counter 701 becomes 0. Further, in FIG. 7, the signal S751 becomes 0 in FIG. 7, and the signal S756 obtained by adding 15 in the adder 705 becomes 15. Since the count value 11 of the read block counter 702 is input to the subtracter 706, the value of the signal S757 becomes 4 which is the result of the subtraction, and the remaining block number m becomes 4 as well.

Since the error flag S662 in the Hi state is output to the interrupt processing unit 6042 included in the encoder 604 as shown in FIG. 6, the interrupt processing unit 6042 receives the signal S665 indicating the remaining block number m to obtain the remaining block number m. Inside the encoder 604, resetting of the loop number possessed by the loop setting unit 6041 is carried out by using the remaining block number m. The remaining block number m is stored in the input image memory 605, and indicates the number of slices in the i-th frame which has not been coded yet. So, the encoder 604 performs coding continuously for the number of the slices and, at timing t95, the coding of the data in the i-th frame is completed.

On the other hand, at timing t94, as in the first embodiment, the error flag holder 709 goes into the reset state by the error reset signal S663b (FIG. 7), and the error flag S662 (FIG. 9) goes into the Lo state.

Since the remaining block number m at timing t95, which is detected from the signal S665 by the encoder 604 after the continuous coding, is 0, the encoder 604 stops coding. Thereafter, at timing t96 when one slice of digital image data S653 in the (i+2)th frame is stored, coding is resumed because the remaining block number m becomes 1.

As described above, according to the image processing apparatus of the second embodiment, the encoder 604 includes the loop setting unit 6041 and the interrupt processing unit 6042, and the flag generator 607 generates and outputs an error flag and a remaining block number, and the encoder 604 starts coding according to the value of the remaining block number m. Therefore, coding can be started after one slice of digital image data has been stored in the input image memory 605, whereby the delay until the start of coding can be reduced as compared with the prior art image processing apparatus which requires storage of data in one frame (15 slices in the image format shown in FIG. 3), resulting in an image processing apparatus suitable for the real-time use.

Further, since the input image memory 605 is managed in slice units, a memory capacity for storing one frame of data suffices. This capacity is smaller than that of the prior art image processing apparatus which requires a capacity for storing at least two frames of data and, therefore, the cost of the apparatus can be reduced.

Further, since the flag generator 607 holds the carry flag, overwriting in slice units can be performed in the input image memory 605. Therefore, even when coding is delayed, the possibility of discarding the frame is reduced, resulting in improved image quality.

Further, in this second embodiment, since the encoder 604 performs coding continuously for the loop number possessed by the loop setting unit 6041 without detecting the signal S665, the processing efficiency is improved as compared with the first embodiment in which the empty flag is detected each time coding for one slice is completed.

Although both of the first and second embodiments employ the image data having the format shown in FIG. 3, the present invention is not restricted thereto. For example, digital image data having any of the following structures may be used as a target to be processed: horizontal 352 pixels×vertical 288 pixels; horizontal 176 pixels×vertical 144 pixels; horizontal 704 pixels×vertical 240 pixels; horizontal 704 pixels×vertical 480 pixels; and horizontal 1020 pixels×vertical 1152 pixels. Further, as a block to be coded, a block of 8 pixels×8 pixels may be used as a unit of coding. In these cases, the signal value indicating the constant to be input to the selector 204 or 704 and the reference value to be input to the comparator 207 or 707 should be adaptively changed from those shown in the first and second embodiments, whereby the same effects as described above are obtained.

Furthermore, as image data to be a target to be processed, luminance data, color difference data, RGB data or the like may be processed with the same effects as described above.

Applicability in Industry

As described above, according to the present invention, in an image processing apparatus or an image processing method for coding image data, since the delay time until start of coding is reduced, preferable display is realized even when it is applied to the use requiring "real time", such as a visual telephone, a camera-display monitor or the like.

Furthermore, according to the present invention, a memory unit having a relatively small capacity can be used as a memory unit for temporarily storing image data when the image data is subjected to coding, whereby a low-cost image processing apparatus is realized.

Moreover, according to the present invention, the possibility of discarding image data to deal with the delay in coding is reduced, and this reduction results in an image processing apparatus of improved image quality.

What is claimed is:

1. An image processing apparatus for storing input image data and subjecting the stored image data to a coding process, said image processing apparatus comprising:
   a temporary storage means for storing the input image data;

an image input control means for controlling storage of the input image data in said temporary storage means;

a storage control means for executing storage of the image data in said temporary storage means under control of said image input control means and, when a predetermined unit storage amount of data has been stored, generating storage information indicating this;

a coding means for reading the image data stored in said temporary storage means to subject the image data to a predetermined coding process and, when a predetermined unit processing amount of data has been subjected to the coding process, generating process information indicating this; and a control information generating means for generating first control information used by said image input control means to control the storage, and generating second control information used by said coding means to control the coding process, in accordance with the storage information generated by said storage control means and the process information generated by said coding means.

2. An image processing apparatus as defined in claim 1, wherein said control information generating means generates, as the first control information, storage stop information indicating that the storage of the input image data should be stopped, and generates, as the second control information, coding stop information indicating that the coding process should be stopped.

3. An image processing apparatus as defined in claim 1, wherein said control information generating means generates, as the first control information, storage stop information indicating that the storage of the input image data should be stopped, and generates, as the second control information, continuous process information indicating how many times said coding means can continuously perform the coding process on the unit processing amount of image data.

4. An image processing apparatus as defined in claim 1, wherein said control information generating means comprises:

a storage information counting means for counting the storage information and holding the result as a storage information count value;

a process information counting means for counting the process information and holding the result of the count as a process information count value;

an addition control means for outputting an addition enabling signal when the count of the storage information is performed a predetermined number of times, and outputting an addition disabling signal when the count of the process information is performed a predetermined number of times;

a storage information count value change means for adding a predetermined value to the storage information count value according to the addition enabling signal or the addition disabling signal, thereby generating a storage information count value after processing;

a codable unit number generating means for subtracting the process information count value from the storage information count value after processing, thereby generating a codable unit number;

a first control information generating means for comparing the codable unit number with a first predetermined value and, when these values match, generating the first control information; and a second control information generating means for comparing the codable unit number with a second predetermined value and, when these values match, generating the second control information.

5. An image processing apparatus as defined in claim 1, wherein said control information generating means comprises:

a storage information counting means for counting the storage information and holding the result as a storage information count value;

a process information counting means for counting the process information and holding the result as a process information count value;

an addition control means for outputting an addition enabling signal when the count of the storage information has been performed a predetermined number of times, and outputting an addition disabling signal when the count of the process information has been performed a predetermined number of times;

a storage information count value change means for adding a predetermined value to the storage information count value according to the addition enabling signal or the addition disabling signal, thereby generating a storage information count value after processing;

a codable unit number generating means for subtracting the process information count value from the storage information count value after processing, thereby generating a codable unit number; and a first control information generating means for comparing the codable unit number with a first predetermined value and, when these values match, generating the first control information;

wherein the codable unit number is used as the second control information.

6. An image processing method for storing input image data in a temporary storage means, and subjecting the stored image data to a coding process, said image processing method comprising:

an image input control step of controlling storage of the input image data in the temporary storage means;

a storage control step of executing storage of the image data in the temporary storage means under control of the image input control step and, when a predetermined unit storage amount of data has been stored, generating storage information indicating this;

a coding step of reading the image data stored in the temporary storage means to subject the image data to a predetermined coding process and, when a predetermined unit processing amount of data has been subjected to the coding process, generating process information indicating this; and a control information generating step of generating first control information used in said image input control step to control the storage, and second control information used in said coding step to control the coding process, according to the storage information generated in said storage control step and the process information generated in said coding step.

7. An image processing method as defined in claim 6, wherein, in said control information generating step, storage stop information indicating that the storage of the input image data should be stopped is generated as the first control information, and coding stop information indicating that the coding process should be stopped is generated as the second control information.

8. An image processing method as defined in claim 6, wherein, in said control information generating step, storage stop information indicating that the storage of the input image data should be stopped is generated as the first control information, and continuous process information indicating how many times the coding process on the unit processing amount of image data can be continuously performed in said coding step is generated as the second control information.

9. An image processing method as defined in claim 6, wherein said control information generating step comprises:
   a storage information counting step of counting the storage information and holding the result as a storage information count value;
   a process information counting step of counting the process information and holding the result as a process information count value;
   an addition control step of outputting an addition enabling signal when the count of the storage information is performed a predetermined number of times, and outputting an addition disabling signal when the count of the process information is performed a predetermined number of times;
   a storage information count value change step of adding a predetermined value to the storage information count value according to the addition enabling signal or the addition disabling signal, thereby generating a storage information count value after processing;
   a codable unit number generating step of subtracting the process information count value from the storage information count value after processing, thereby generating a codable unit number;
   a first control information generating step of comparing the codable unit number with a first predetermined value and, when these values match, generating the first control information; and
   a second control information generating step of comparing the codable unit number with a second predetermined value and, when these values match, generating the second control information.

10. An image processing method as defined in claim 6, wherein said control information generating step comprises:
   a storage information counting step of counting the storage information and holding the result as a storage information count value;
   a process information counting step of counting the process information and holding the result as a process information count value;
   an addition control step of outputting an addition enabling signal when the count of the storage information is performed a predetermined number of times, and outputting an addition disabling signal when the count of the process information is performed a predetermined number of times;
   a storage information count value change step of adding a predetermined value to the storage information count value according to the addition enabling signal or the addition disabling signal, thereby generating a storage information count value after processing;
   a codable unit number generating step of subtracting the process information count value from the storage information count value after processing, thereby generating a codable unit number;
   a first control information generating step of comparing the codable unit number with a first predetermined value and, when these values match, generating the first control information; and
   a second control information generating step in which the codable unit number is used as the second control information.

11. An image processing apparatus for storing input image data and subjecting the stored image data to a coding process, said image processing apparatus comprising:
   a temporary storage device operable to store the input image data;
   an image input control device operable to control storage of the input image data in said temporary storage device;
   a storage control device operable to execute storage of the image data in said temporary storage device under control of said image input control device and, when a predetermined unit storage amount of data has been stored, generate storage information indicating this;
   a coding device operable to read the image data stored in said temporary storage device to subject the image data to a predetermined coding process and, when a predetermined unit processing amount of data has been subjected to the coding process, generate process information indicating this; and
   a control information generating device operable to generate first control information used by said image input control device to control the storage, and generate second control information used by said coding device to control the coding process, in accordance with the storage information generated by said storage control device and the process information generated by said coding device.

12. An image processing apparatus as defined in claim 11, wherein said control information generating device is operable to generate, as the first control information, storage stop information indicating that the storage of the input image data should be stopped, and generate, as the second control information, coding stop information indicating that the coding process should be stopped.

13. An image processing apparatus as defined in claim 11, wherein said control information generating device is operable to generate, as the first control information, storage stop information indicating that the storage of the input image data should be stopped, and generate, as the second control information, continuous process information indicating how many times said coding device can continuously perform the coding process on the unit processing amount of image data.

14. An image processing apparatus as defined in claim 11, wherein said control information generating device comprises:
   a storage information counting device operable to count the storage information and hold the result as a storage information count value;
   a process information counting device operable to count the process information and hold the result of the count as a process information count value;
   an addition control device operable to output an addition enabling signal when the count of the storage information is performed a predetermined number of times, and output an addition disabling signal when the count of the process information is performed a predetermined number of times;
   a storage information count value change device operable to add a predetermined value to the storage information count value according to the addition enabling signal or the addition disabling signal, thereby generating a storage information count value after processing;
   a codable unit number generating device operable to subtract the process information count value from the storage information count value after processing, thereby generating a codable unit number;
   a first control information generating device operable to compare the codable unit number with a first predetermined value and, when these values match, generate the first control information; and
   a second control information generating device operable to compare the codable unit number with a second predetermined value and, when these values match, generate the second control information.

15. An image processing apparatus as defined in claim 11, wherein said control information generating device comprises:

a storage information counting device operable to count the storage information and hold the result as a storage information count value;

a process information counting device operable to count the process information and hold the result as a process information count value;

an addition control device operable to output an addition enabling signal when the count of the storage information has been performed a predetermined number of times, and output an addition disabling signal when the count of the process information has been performed a predetermined number of times;

a storage information count value change device operable to add a predetermined value to the storage information count value according to the addition enabling signal or the addition disabling signal, thereby generating a storage information count value after processing;

a codable unit number generating device operable to subtract the process information count value from the storage information count value after processing, thereby generating a codable unit number; and a first control information generating device operable to compare the codable unit number with a first predetermined value and, when these values match, generate the first control information;

wherein the codable unit number is used as the second control information.

16. An image processing method for storing input image data in a temporary storage device, and subjecting the stored image data to a coding process, said image processing method comprising:

controlling storage of the input image data in the temporary storage device;

executing storage of the image data in the temporary storage device under control of said controlling and, when a predetermined unit storage amount of data has been stored, generating storage information indicating this;

reading the image data stored in the temporary storage device to subject the image data to a predetermined coding process and, when a predetermined unit processing amount of data has been subjected to the coding process, generating process information indicating this; and generating first control information used in said controlling to control the storage, and second control information used in said reading to control the coding process, according to the storage information generated in said executing storage and the process information generated in said reading.

17. An image processing method as defined in claim 16, wherein, in said generating, storage stop information indicating that the storage of the input image data should be stopped is generated as the first control information, and coding stop information indicating that the coding process should be stopped is generated as the second control information.

18. An image processing method as defined in claim 16, wherein, in said generating, storage stop information indicating that the storage of the input image data should be stopped is generated as the first control information, and continuous process information indicating how many times the coding process on the unit processing amount of image data can be continuously performed in said reading is generated as the second control information.

19. An image processing method as defined in claim 16, wherein said generating comprises:

counting the storage information and holding the result as a storage information count value;

counting the process information and holding the result as a process information count value;

outputting an addition enabling signal when the count of the storage information is performed a predetermined number of times, and outputting an addition disabling signal when the count of the process information is performed a predetermined number of times;

adding a predetermined value to the storage information count value according to the addition enabling signal or the addition disabling signal, thereby generating a storage information count value after processing;

subtracting the process information count value from the storage information count value after processing, thereby generating a codable unit number;

comparing the codable unit number with a first predetermined value and, when these values match, generating the first control information; and comparing the codable unit number with a second predetermined value and, when these values match, generating the second control information.

20. An image processing method as defined in claim 16, wherein said generating comprises:

counting the storage information and holding the result as a storage information count value;

counting the process information and holding the result as a process information count value, outputting an addition enabling signal when the count of the storage information is performed a predetermined number of times, and outputting an addition disabling signal when the count of the process information is performed a predetermined number of times;

adding a predetermined value to the storage information count value according to the addition enabling signal or the addition disabling signal, thereby generating a storage information count value after processing;

subtracting the process information count value from the storage information count value after processing, thereby generating a codable unit number;

comparing the codable unit number with a first predetermined value and, when these values match, generating the first control information; and using the codable unit number as the second control information.

21. An image processing apparatus as defined in claim 1, wherein the predetermined unit storage amount of data and the predetermined unit processing amount of data each comprise one slice unit quantity of data.

22. An image processing method as defined in claim 6, wherein the predetermined unit storage amount of data and the predetermined unit processing amount of data each comprise one slice unit quantity of data.

23. An image processing apparatus as defined in claim 11, wherein the predetermined unit storage amount of data and the predetermined unit processing amount of data each comprise one slice unit quantity of data.

24. An image processing method as defined in claim 16, wherein the predetermined unit storage amount of data and the predetermined unit processing amount of data each comprise one slice unit quantity of data.

* * * * *